(12) United States Patent
Takasaki

(10) Patent No.: US 8,215,760 B2
(45) Date of Patent: Jul. 10, 2012

(54) INK SET AND INKJET RECORDING METHOD

(75) Inventor: Masaru Takasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1026 days.

(21) Appl. No.: 12/161,449

(22) PCT Filed: Jan. 19, 2007

(86) PCT No.: PCT/JP2007/051211
§ 371 (c)(1),
(2), (4) Date: Jul. 18, 2008

(87) PCT Pub. No.: WO2007/083841
PCT Pub. Date: Jul. 26, 2007

(65) Prior Publication Data
US 2010/0231663 A1    Sep. 16, 2010

(30) Foreign Application Priority Data

Jan. 20, 2006    (JP) .................................. 2006-012981

(51) Int. Cl.
*C09D 11/02*    (2006.01)
(52) U.S. Cl. .................. 347/100; 106/31.47; 106/31.48; 106/31.59
(58) Field of Classification Search .................. 347/100; 106/31.48, 31.59, 31.47
See application file for complete search history.

(56) References Cited

U.S. PATENT DOCUMENTS

| | | | | |
|---|---|---|---|---|
| 4,745,174 A | * | 5/1988 | Pruett et al. | 528/289 |
| 6,471,760 B1 | * | 10/2002 | Matsumoto et al. | 106/31.47 |
| 7,083,666 B2 | * | 8/2006 | Taguchi et al. | 106/31.43 |
| 2002/0107301 A1 | * | 8/2002 | Yamanouchi et al. | 523/160 |
| 2004/0089200 A1 | * | 5/2004 | Fujiwara et al. | 106/31.48 |
| 2004/0187738 A1 | * | 9/2004 | Taguchi et al. | 106/31.48 |
| 2005/0115458 A1 | | 6/2005 | Oki et al. | |
| 2005/0115459 A1 | | 6/2005 | Hanmura et al. | |
| 2005/0231574 A1 | * | 10/2005 | Ozawa | 347/100 |
| 2006/0009357 A1 | | 1/2006 | Fujiwara et al. | |
| 2006/0032397 A1 | * | 2/2006 | Banning et al. | 106/31.29 |

FOREIGN PATENT DOCUMENTS

| | | |
|---|---|---|
| JP | 2002-285050 A | 10/2002 |
| JP | 2002-309118 A | 10/2002 |
| JP | 2002-371079 A | 12/2002 |
| JP | 2002-371214 A | 12/2002 |
| JP | 2003-192930 A | 7/2003 |
| JP | 2004-2670 A | 1/2004 |
| JP | 2005-105136 A | 4/2005 |
| JP | 2005-206751 A | 8/2005 |
| JP | 2005-254475 A | 9/2005 |
| JP | 2005-255951 A | 9/2005 |
| WO | 2004/104108 A1 | 12/2004 |

OTHER PUBLICATIONS

European Patent Office, European Search Report, dated Jun. 9, 2011, issued in Application No. 07707443.3.

* cited by examiner

*Primary Examiner* — Matthew Luu
*Assistant Examiner* — Rut Patel
(74) *Attorney, Agent, or Firm* — Sughrue Mion, PLLC

(57) ABSTRACT

An ink set includes at least a magenta ink composition and a cyan ink composition, wherein the magenta ink composition includes: at least one colorant selected from the group consisting of specific heterylazo dyes; and at least one colorant selected from the group consisting of specific anthrapyridone dyes, and the cyan ink composition includes at least one colorant selected from the group consisting of phthalocyanine compounds meeting requirements 1 and 2: Requirement 1: The ratio of the maximum absorbance within the absorption band of from 660 nm to 680 nm to the maximum absorbance within the absorption band of from 600 nm to 640 nm on the spectral absorption curve of aqueous solution is less than 1; and Requirement 2: The oxidation potential is more positive than 1.0 eV (vsSCE).

15 Claims, No Drawings

INK SET AND INKJET RECORDING METHOD

TECHNICAL FIELD

The present invention relates to an ink set and an inkjet recording method capable of forming an image excellent in light-resistance and ozone resistance.

BACKGROUND ART

Inkjet recording method has been rapidly spread and further developed because it requires a reduced material cost, allows a high speed recording, causes little noise during recording and allows easy color recording.

Examples of inkjet recording method include a continuous method involving continuous ejection of droplets and an on-demand method involving ejection of droplets according to an image data signal. Examples of ejection method include a method which allows a piezoelectric element to give pressure that causes a droplet to be ejected, a method which comprises heating the ink to generate bubbles, causing a droplet to be ejected, a method involving the use of ultrasonic wave, and a method which uses electrostatic force to suck and discharge a droplet. As inks for these inkjet recording methods there are used aqueous inks, oil-based inks and solid (melt type) inks.

The colorants to be incorporated in these inks for inkjet recording are required to exhibit a high solubility in solvents, allow a high density recording and have a good hue and an excellent fastness to light, heat, active gas in the atmosphere (e.g., oxidizing gas such as NOx and ozone, SOx), water and chemical, a good fixability to image-receiving materials, difficulty in bleeding, an excellent preservability, no toxicity and a high purity and be available at a low cost.

However, it is extremely difficult to find dyes meeting all these requirements to a high extent. In particular, there have been keenly desired colorants having a good hue, a high fixability to the image recording material even under high humidity conditions a high fastness to light and active gases in the atmosphere, particularly oxidizing gas such as ozone.

In recent years, it has been practiced to form a color image and obtain a recorded matter by an inkjet recording method using a plurality of color ink compositions. In general, a color image is formed by four color ink compositions, i.e., yellow ink composition, magenta ink composition and cyan ink composition, and optionally a black ink composition. Further, in some cases, a color image is formed by six color ink compositions, i.e., light cyan ink composition and light magenta ink composition in addition to the four color ink compositions. In further cases, a color image is formed by seven color ink compositions, i.e., dark yellow ink composition in addition to the six color ink compositions. A combination of two or more of these ink compositions is called an ink set.

The aforementioned ink compositions to be used in the formation of a color image need to meet requirements that they each have a good color developability, any combination of a plurality of ink compositions can develop a good intermediate color and the recorded matter obtained therefrom undergoes no fading during storage.

When the light-resistance or ozone resistance of a specific ink composition in the ink set is remarkably lower than that of the other ink compositions, the color developed from the specific ink composition fades faster than the other colors, causing the deterioration of tone balance of the entire image. In addition to the requirement that the light-resistance or ozone resistance of the various ink compositions constituting the ink set be enhanced, a requirement is preferably met that the rate of deterioration such as fading of the images formed by the various ink compositions be as the same as possible. In other words, it is desirable that the various ink compositions constituting the ink set be excellent in light-resistance or ozone resistance and have a small difference in light-resistance or ozone resistance among themselves.

A representative example of the skeleton of cyan dye used in ink for inkjet recording is a phthalocyanine dye. In recent years, phthalocyanine dyes having improved light-resistance and ozone resistance have been proposed in JP-A-2002-285050, JP-A-2002-309118 and JP-A-2004-002670.

On the other hand, representative examples of the skeleton of magenta dye used in ink for inkjet recording include xanthene dyes disclosed in JP-A-8-60053, H-acid azo dyes disclosed in JP-A-7-157698, and anthrapyridone dyes and heterocyclic-heterocyclic azo dyes disclosed in JP-A-57-195775, JP-A-59-074173, JP-A-10-306221 and JP-A-2000-191660.

Among these dyes, the xanthene dyes are excellent in hue and sharpness but leave something to be desired in light-resistance and ozone resistance. The H-acid azo dyes are excellent in hue or water resistance but leave something to be desired in light-resistance, ozone resistance and sharpness. The anthrapyridone dyes are excellent in sharpness and light-resistance but leave something to be desired in ozone resistance. In recent years, however, anthrapyridone dyes having improved ozone resistance have been disclosed in JP-A-2003-192930, International Publication No. 04/104108, etc. but still leave something to be desired.

Further, heterocyclic-heterocyclic azo dyes excellent in light-resistance and ozone resistance have been proposed in JP-A-2002-371079, JP-A-2002-371214, etc. but leave something to be desired in fixability to the image-receiving material under high humidity conditions.

DISCLOSURE OF THE INVENTION

The invention is intended to solve the aforementioned problems and accomplish the following aims.

A first aim of the invention is to provide an inkjet recording magenta ink capable of forming an image having a good fixability to an image-receiving material even under high humidity conditions and a high fastness to light and active gases in the atmosphere, particularly ozone gas, and an ink set containing the ink set.

A second aim of the invention is to provide an ink set comprising various ink compositions which exhibit excellent light-resistance and ozone resistance that are well-balanced among the ink compositions, specific one of which ink compositions being not subject to fading or discoloration with respect to light or ozone faster than the others.

The inventors made it possible to solve the aforementioned problems by using the following constitutions.
(1) An ink set comprising at least a magenta ink composition and a cyan ink composition, wherein the magenta ink composition comprises: at least one colorant selected from the group consisting of compounds represented by a general formula (1); and at least one colorant selected from the group consisting of compounds represented by a general formula (2), and the cyan ink composition comprises at least one colorant selected from the group consisting of phthalocyanine compounds meeting requirements 1 and 2: Requirement 1: The ratio of the maximum absorbance within the absorption band of from 660 nm to 680 nm to the maximum absorbance within the absorption band of from 600 nm to 640 nm on the spectral absorption curve of aqueous solution is less than 1; and Requirement 2: The oxidation potential is more positive than 1.0 eV (vsSCE);

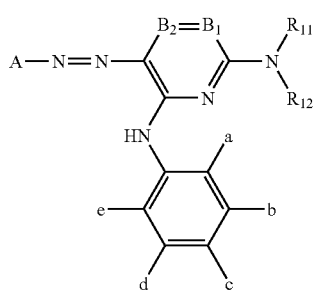

General Formula (1)

wherein A represents a residue of 5-membered heterocyclic diazo component A-$NH_2$; $B_1$ and $B_2$ represent —$CR_{13}$= and —$CR_{14}$=, respectively, or one of $B_1$ and $B_2$ represents a nitrogen atom and the other represents one of —$CR_{13}$= and —$CR_{14}$=; $R_{11}$ and $R_{12}$ each independently represent one of a hydrogen atom, aliphatic group, aromatic group, heterocyclic group, acyl group, alkoxycarbonyl group, aryloxycarbonyl group, carbamoyl group, alkylsulfonyl group, arylsulfonyl group and sulfamoyl group; $R_{13}$ and $R_{14}$ each independently represent one of a hydrogen atom, halogen atom, aliphatic group, aromatic group, heterocyclic group, cyano group, carbamoyl group, alkoxycarbonyl group, aryloxycarbonyl group, acyl group, hydroxyl group, alkoxy group, aryloxy group, silyloxy group, acyloxy group, carbamoyloxy group, heterocyclic oxy group, alkoxycarbonyloxy group, aryloxycarbonyloxy group, amino group, acylamino group, aminocarbonylamino group, sulfamoylamino group, alkoxycarbonylamino group, aryloxycarbonylamino group, alkylsulfonylamino group, arylsulfonylamino group, nitro group, alkylthio group, arylthio group, alkylsulfonyl group, arylsulfonyl group, alkylsulfiyl group, arylsulfinyl group, sulfamoyl group, heterocyclic thio group and ionic hydrophilic group, with the proviso that $R_{13}$ and $R_{11}$ or $R_{11}$ and $R_{12}$ may be bonded to each other to form one of a 5-membered ring and 6-membered ring; a and e each independently represent one of an alkyl group, alkoxy group and halogen atom, with the proviso that when a and e each are an alkyl group, the total number of carbon atoms constituting the alkyl group is 3 or more and the alkyl group may be substituted; b, c and d each have the same meaning as $R_{13}$ or $R_{14}$; and a and b or e and d may be condensed to each other, with the proviso that the general formula (1) has at least one ionic hydrophilic group; and

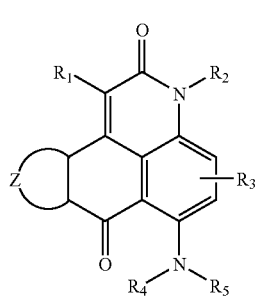

General Formula (2)

wherein $R_1$ represents one of a hydrogen atom and electron withdrawing group; $R_2$ and $R_3$ each independently represent one of a hydrogen atom and substituent; $R_4$ and $R_5$ each independently represent one of a hydrogen atom, aliphatic group, aromatic group and heterocyclic group; and Z represents a nonmetallic atom group required to form one of a 5- to 7-membered aromatic ring with carbon atoms and 5- to 7-membered heterocyclic ring with carbon atoms, with the proviso that the general formula (2) has at least one ionic hydrophilic group.

(2) The ink set as described in the item (1), wherein the cyan ink composition comprises at least one colorant selected from the group consisting of phthalocyanine compounds represented by a general formula (3):

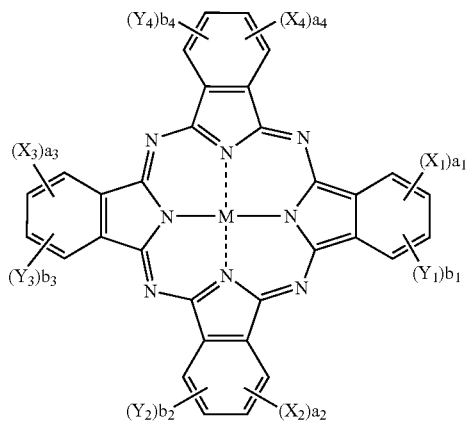

General Formula (3)

wherein $X_1$, $X_2$, $X_3$ and $X_4$ each independently represent one of —SO—Z, —$SO_2$—Z, —$SO_2NV_1V_2$, —$CONV_1V_2$, —$CO_2Z$, —CO—Z and sulfo group in which Z's each independently represent one of a substituted or unsubstituted aliphatic group, substituted or unsubstituted aromatic group and substituted or unsubstituted heterocyclic group; $V_1$ and $V_2$ may be the same or different and each represent one of a hydrogen atom, substituted or unsubstituted aliphatic group, substituted or unsubstituted aromatic group and substituted or unsubstituted heterocyclic group; $Y_1$, $Y_2$, $Y_3$ and $Y_4$ each independently represent one of a hydrogen atom, halogen atom, aliphatic group, aromatic group, heterocyclic group, cyano group, hydroxyl group, nitro group, amino group, alkylamino group, alkoxy group, aryloxy group, amide group, arylamino group, aminocarbonylamino group, sulfamoylamino group, alkylthio group, arylthio group, alkoxycarbonylamino group, sulfonamide group, carbamoyl group, sulfamoyl group, alkoxycarbonyl group, heterocyclic oxy group, azo group, acyloxy group, carbamoyloxy group, silyloxy group, aryloxycarbonyl group, aryloxycarbonylamino group, imido group, heterocyclic thio group, phosphoryl group, acyl group and ionic hydrophilic group; $a_1$ to $a_4$ and $b_1$ to $b_4$ each represent the number of substituents on $X_1$ to $X_4$ and $Y_1$ to $Y_4$, respectively, with the proviso that $a_1$ to $a_4$ each independently represent an integer of from 0 to 4 and are not 0 at the same time and $b_1$ to $b_4$ each independently represent an integer of from 0 to 4; and M represents one of a hydrogen atom, metal atom and oxide, hydroxide or halide thereof, with the proviso that at least one of $X_1$, $X_2$, $X_3$, $X_4$, $Y_1$, $Y_2$, $Y_3$ and $Y_4$ is one of an ionic hydrophilic group and a group having an ionic hydrophilic group as substituent.

(3) The ink set as described in the item (1) or (2), wherein the mass ratio of the compound represented by the general formula (1) to the compound represented by the general formula (2) in the magenta ink composition is from 1:1 to 1:4.
(4) The ink set as described in any one of the items (1) to (3), wherein the concentration of free copper ions in the cyan ink composition is 10 ppm or less.
(5) The ink set as described in any one of items (1) to (4), wherein the general formula (1) is represented by a general formula (4):

General Formula (4)

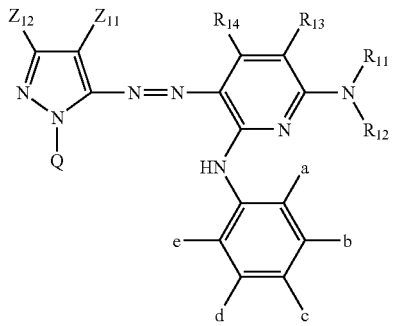

wherein $Z_{11}$ represents an electron withdrawing group having a Hammett's substituent constant σp value of 0.20 or more; $Z_{12}$ represents one of a hydrogen atom, aliphatic group, aromatic group, heterocyclic group and acyl group; $R_{11}$, $R_{12}$, $R_{13}$, $R_{14}$, a, b, c, d and e each are as claimed in the general formula (I); and Q represents one of a hydrogen atom, aliphatic group, aromatic group and heterocyclic group, with the proviso that the general formula (4) has at least one ionic hydrophilic group.
(6) The ink set as described in any one of the items (1) to (5), wherein, in the general formula (2), $R_1$ is an electron withdrawing group having a Hammett's substituent constant σp value of 0.20 or more, and $R_3$ represents one of a hydrogen atom and aryloxy group.
(7) The ink set as described in any one of the items (1) to (6), wherein Z in the general formula (2) is an anthrapyridone compound represented by a general formula (5) which forms a benzene ring with carbon atoms:

General Formula (5)

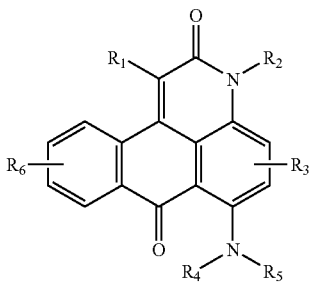

wherein $R_6$ represents one of a hydrogen atom and substituent; $R_1$, $R_2$, $R_3$, $R_4$ and $R_5$ each are as defined in the general formula (2), with the proviso that the general formula (5) has at least one ionic hydrophilic group.
(8) An ink set comprising magenta ink compositions, wherein the magenta ink compositions comprise two magenta ink compositions having different color densities, and at least one of the two magenta ink compositions is a magenta ink composition as claimed in any one of Claims 1 to 7.
(9) An ink set comprising cyan ink compositions, wherein the cyan ink compositions comprise two cyan ink compositions having different color densities, and at least one of the two cyan ink compositions is a cyan ink composition as claimed in any one of Claims 1 to 7.
(10) An ink cartridge comprising an ink set as described in any one of the items (1) to (9) integrally or independently received therein.
(11) An inkjet printer comprising an ink cartridge as described in the item (10) mounted therein.
(12) An inkjet recording method comprising: recording by using an ink set as claimed in any one of Claims 1 to 9 or an ink cartridge as claimed in Claim 10.
(13) An inkjet recording method comprising: forming an image on an image-receiving material having an ink-receptive layer containing an inorganic white pigment provided on a support by using an ink set as described in any one of the items (1) to (9) or an ink cartridge as described in the item (10).

BEST MODE FOR CARRYING OUT THE INVENTION

Embodiments of implementation of the invention will be described in detail hereinafter.
The substituents to be used herein will be somewhat described. Examples of the substituents to be used herein include the following groups (hereinafter referred to as "substituent W").
Examples of the substituents include halogen atoms, alkyl groups, alkenyl groups, alkinyl groups, aryl groups, heterocyclic groups, cyano groups, hydroxyl groups, nitro groups, carboxyl groups, alkoxy groups, aryloxy groups, silyloxy groups, heterocyclic oxy groups, acyloxy groups, carbamoyloxy groups, alkoxycarbonyloxy groups, aryloxycarbonyloxy groups, amino groups, acylamino groups, aminocarbonylamino groups, alkoxycarbonylamino groups, aryloxycarbonylamino groups, sulfamoylamino groups, alkylsulfonylamino groups, arylsulfonylamino groups, mercapto groups, alkylthio groups, arylthio groups, heterocyclic thio groups, sulfamoyl groups, alkylsulfinyl groups, arylsulfinyl groups, alkylsulfonyl groups, arylsulfonyl groups, acyl groups, aryloxycarbonyl groups, alkoxycarbonyl groups, carbamoyl groups, arylazo groups, heterocyclic azo groups, imido groups, phosphino groups, phosphinyl groups, phosphinyl groups, phosphinylamino groups, and silyl groups.
The term "aliphatic group" as used herein is meant to include alkyl groups, substituted alkyl groups, alkenyl groups, substituted alkenyl groups, alkinyl groups, and substituted alkinyl groups. The term "aromatic group" as used herein is meant to include aryl groups and substituted aryl groups.
More specifically, examples of the halogen atom include fluorine atom, chlorine atom, bromine atom, and iodine atom.
Examples of the alkyl group include straight-chain, branched and cyclic substituted or unsubstituted alkyl groups. Further examples of the alkyl group include cycloalkyl groups, bicycloalkyl groups, and those having more cyclic structures such as tricyclo structure. The alkyl group in the substituents described below (e.g., alkyl group in alkoxy group and alkylthio group), too, represents an alkyl group having the aforementioned concept. Specific preferred examples of the alkyl group include $C_1$-$C_{30}$ alkyl groups such as methyl, ethyl, n-propyl, isopropyl, t-butyl, n-octyl, eicosil, 2-chloroethyl, 2-cyanoethyl and 2-ethylhexyl. Specific preferred examples of the cycloalkyl group include $C_3$-$C_{30}$ substituted or unsubstituted cycloalkyl groups such as cyclohexyl, cyclopentyl and 4-n-dodecyl cyclohexyl. Specific preferred examples of the bicycloalkyl groups include $C_5$-$C_{30}$ substituted or unsubstituted bicycloalkyl groups, i.e., monovalent groups obtained by removing one hydrogen atom from $C_5$-$C_{30}$ bicycloalkanes, e.g., bicyclo[1,2,2]heptane-2-il and bicyclo[2,2,2]octane-3-il.

Examples of the alkenyl groups include straight-chain, branched and cyclic substituted or unsubstituted alkenyl groups such as cycloalkenyl and bicycloalkenyl. Specific preferred examples of the alkenyl groups include $C_2$-$C_{30}$ substituted or unsubstituted alkenyl groups such as vinyl, allyl, prenyl, gelanyl and oleyl. Specific preferred examples of the cycloalkenyl groups include $C_3$-$C_{30}$ substituted or unsubstituted cycloalkenyl groups, i.e., monovalent groups obtained by removing one hydrogen atom from $C_3$-$C_{30}$ cycloalkenes, e.g., 2-cyclopentene-1-il and 2-cyclohexane-1-il. Specific examples of the bicycloalkenyl groups include substituted or unsubstituted bicycloalkenyl groups, preferably $C_5$-$C_{30}$ substituted or unsubstituted bicycloalkenyl groups, i.e., monovalent group obtained by removing one hydrogen atom from bicycloalkene having one double bond, e.g., bicyclo[2,2,1]hepto-2-ene-1-il and bicyclo[2,2,2]octo-2-ene-4-il.

Specific preferred examples of the alkinyl groups include $C_2$-$C_{30}$ substituted or unsubstituted alkinyl groups such as ethynyl, propargyl and trimethylsilyl ethynyl.

Preferred examples of the aryl groups include $C_6$-$C_{30}$ substituted or unsubstituted aryl groups such as phenyl, o-tolyl, naphthyl, m-chlorophenyl and o-hexadecanoyl aminophenyl.

The heterocyclic group is, preferably a monovalent group obtained by removing one hydrogen atom from a 5- or 6-membered substituted or unsubstituted aromatic or non-aromatic heterocyclic compound, more preferably a $C_3$-$C_{30}$ 5- or 6-membered aromatic heterocyclic group such as 2-furyl, 2-chenyl, 2-pyrimidinyl and 2-benzothiazoline.

Preferred examples of the alkoxy groups include $C_1$-$C_{30}$ substituted or unsubstituted alkoxy groups such as methoxy, ethoxy, isopropoxy, t-butoxy, n-octyl and 2-methoxyethoxy.

Preferred examples of the aryloxy groups include $C_6$-$C_{30}$ substituted or unsubstituted aryloxy groups such as phenoxy, 2-methylphenoxy, 4-t-butylhenoxy, 3-nitrophenoxy and 2-tetradecanoylaminophenoxy.

Preferred examples of the silyloxy groups include $C_0$-$C_{20}$ substituted or unsubstituted silyloxy groups such as trimethylsilyloxy and diphenylmethylsilyloxy.

Preferred examples of the heterocyclic oxy groups include $C_2$-$C_{30}$ substituted or unsubstituted heterocyclic oxy groups such as 1-phenyltetrazole-5-oxy and 2-tetrahydropyranyloxy.

Preferred examples of the acyloxy groups include formyloxy group, $C_2$-$C_{30}$ substituted or unsubstituted alkylcarbonyloxy groups and $C_6$-$C_{30}$ substituted or unsubstituted arylcarbonyloxy groups such as acetyloxy, pivaloyloxy, stearoyloxy, benzoyloxy and p-methoxy phenylcarbonyloxy.

Preferred examples of the carbamoyloxy groups include $C_1$-$C_{30}$ substituted or unsubstituted carbamoyloxy groups such as N,N-dimethylcarbamoyloxy, N,N-diethylcarbamoyloxy, morpholinocarbonyloxy, N,N-di-n-octylaminocarbonyloxy and N-n-octylcarbamoyloxy.

Preferred examples of the alkoxycarbonyloxy groups include $C_2$-$C_{30}$ substituted or unsubstituted alkoxycarbonyloxy groups such as methoxycarbonyloxy, ethoxycarbonyloxy, t-butoxycarbonyloxy and n-octyl carbonyloxy.

Preferred examples of the aryloxycarbonyloxy groups include $C_7$-$C_{30}$ substituted or unsubstituted aryloxycarbonyloxy groups such as phenoxycarbonyloxy, p-methoxyphenoxycarbonyloxy and p-n-hexadecyloxy phenoxycarbonyloxy.

Examples of the amino groups include alkylamino groups, acylamino groups, and heterocyclic amino groups. Preferred examples of the amino groups include amino groups, $C_1$-$C_{30}$ substituted or unsubstituted alkylamino groups and $C_6$-$C_{30}$ substituted or unsubstituted anilino groups such as methylamino, dimethylamino, anilino, N-methyl-anilino and diphenylamino.

Preferred examples of the acylamino groups include formylamino groups, $C_1$-$C_{30}$ substituted or unsubstituted alkylcarbonylamino groups and $C_6$-$C_{30}$ substituted or unsubstituted arylcarbonylamino groups such as acetylamino, pivaloylamino, lauroylamino, benzoylamino and 3,4,5-tri-n-octyloxyphenylcarbonylamino.

Preferred examples of the aminocarbonylamino groups include $C_1$-$C_{30}$ substituted or unsubstituted aminocarbonylamino groups such as carbamoylamino, N,N-dimethylaminocarbonylamino, N,N-diethylamino carbonylamino and morpholinocarbonylamino.

Preferred examples of the alkoxycarbonylamino groups include $C_2$-$C_{30}$ substituted or unsubstituted alkoxycarbonylamino groups such as methoxycarbonylamino, ethoxycarbonylamino, t-butoxycarbonylamino, n-octadecyloxycarbonylamino and N-methyl-methoxycarbonylamino.

Preferred examples of the aryloxycarbonylamino groups include $C_7$-$C_{30}$ substituted or unsubstituted aryloxycarbonylamino groups such as phenoxycarbonylamino, p-chlorophenoxycarbonylamino and m-n-octyloxyphenoxycarbonylamino.

Preferred examples of the sulfamoylamino groups include $C_0$-$C_{30}$ substituted or unsubstituted sulfamoylamino groups such as sulfamoylamino group, N,N-dimethylaminosulfonylamino and N-n-octylaminosulfonyl amino.

Preferred examples of the alkylsulfonylamino or arylsulfonylamino groups include $C_1$-$C_{30}$ substituted or unsubstituted alkylsulfonylamino groups and $C_6$-$C_{30}$ substituted or unsubstituted arylsulfonylamino groups such as methylsulfonylamino, butylsulfonylamino, phenylsulfonylamino, 2,3,5-trichlorophenylsulfonyl amino and p-methylphenylsulfonylamino.

Preferred examples of the alkylthio groups include $C_1$-$C_{30}$ substituted or unsubstituted alkylthio groups such as methylthio, ethylthio and n-hexadecylthio.

Preferred examples of the arylthio groups include $C_6$-$C_{30}$ substituted or unsubstituted arylthio groups such as phenylthio, p-chorophenylthio and m-methoxyphenyl thio.

Preferred examples of the heterocyclic thio groups include $C_2$-$C_{30}$ substituted or unsubstituted heterocyclic thio groups such as 2-benzothiazolylthio and 1-phenyl tetrazole-5-ilthio.

Preferred examples of the sulfamoyl groups include $C_0$-$C_{30}$ substituted or unsubstituted sulfamoyl groups such as N-ethylsulfamoyl, N-(3-dodecyloxypropyl)sulfamoyl, N,N-dim ethylsulfamoyl, N-acetylsulfamoyl, N-benzoyl sulfamoyl and N—(N'-phenylcarbamoyl)sulfamoyl.

Preferred examples of the alkylsulfinyl groups or arylsulfinyl groups include $C_1$-$C_{30}$ substituted or unsubstituted alkylsulfinyl groups and $C_6$-$C_{30}$ substituted or unsubstituted arylsulfinyl groups such as methylsulfinyl, ethylsulfinyl, phenylsulfinyl and p-methylphenylsulfinyl.

Preferred examples of the alkylsulfonyl or arylsulfonyl groups include $C_1$-$C_{30}$ substituted or unsubstituted alkylsulfonyl groups and $C_6$-$C_{30}$ substituted or unsubstituted arylsulfonyl groups such as methylsulfonyl, ethylsulfonyl, phenylsulfonyl and p-methylphenylsulfonyl.

Preferred examples of the acyl groups include formyl groups, $C_2$-$C_{30}$ substituted or unsubstituted alkylcarbonyl groups, $C_7$-$C_{30}$ substituted or unsubstituted arylcarbonyl groups and $C_2$-$C_{30}$ substituted or unsubstituted heterocyclic carbonyl groups connected to carbonyl group with carbon atom, e.g., acetyl, pivaloyl, 2-chloroacetyl, stearoyl, benzoyl, p-n-octyloxyphenylcarbonyl, 2-pyridylcarbonyl, 2-furyl carbonyl.

Preferred examples of the aryloxycarbonyl groups include $C_7$-$C_{30}$ substituted or unsubstituted aryloxycarbonyl groups such as phenoxycarbonyl, o-chlorophenoxycarbonyl, m-nitrophenoxycarbonyl and p-t-butylphenoxycarbonyl.

Preferred examples of the alkoxycarbonyl groups include $C_2$-$C_{30}$ substituted or unsubstituted alkoxycarbonyl groups such as methoxycarbonyl, ethoxycarbonyl, t-butoxycarbonyl and n-octadecyloxy carbonyl.

Preferred examples of the carbamoyl groups include $C_1$-$C_{30}$ substituted or unsubstituted carbamoyl groups such as carbamoyl, N-methylcarbamoyl, N,N-dimethyl carbamoyl, N,N-di-n-octylcarbamoyl and N-(methylsulfonyl)carbamoyl.

Preferred examples of the arylazo or heterocyclic azo groups include $C_6$-$C_{30}$ substituted or unsubstituted arylazo groups and $C_3$-$C_{30}$ substituted or unsubstituted heterocyclic azo groups such as phenylazo, p-chloro phenylazo and 5-ethylthio-1,3,4-thiadiazole-2-ilazo.

Preferred examples of the imido groups include N-succinimide group and N-phthalimide group.

Preferred examples of the phosphino groups include $C_0$-$C_{30}$ substituted or unsubstituted phosphino groups such as dimethylphosphino, diphenylphosphino and methyl phenoxyphosphino.

Preferred examples of the phosphinyl groups include $C_0$-$C_{30}$ substituted or unsubstituted phosphinyl groups such as phosphinyl, dioctyloxyphosphinyl and diethoxyphosphinyl.

Preferred examples of the phosphinyloxy groups include $C_0$-$C_{30}$ substituted or unsubstituted phosphinyloxy groups such as diphenoxyphosphinyloxy and dioctyloxyphosphinyloxy.

Preferred examples of the phosphinylamino groups include $C_0$-$C_{30}$ substituted or unsubstituted phosphinylamino groups such as dimethoxyphosphinylamino and dimethylaminophosphinylamino.

Preferred examples of the silyl groups include $C_0$-$C_{30}$ substituted or unsubstituted silyl groups such as trimethylsilyl, t-butyldimethylsilyl and phenyldimethyl silyl.

Among the aforementioned substituents, those having hydrogen atoms may have these hydrogen atoms substituted by the aforementioned substituents. Examples of such substituents include alkylcarbonyl aminosulfonyl groups, arylcarbonylaminosulfonyl groups, alkylsulfonylamino carbonyl groups, and aryl sulfonylaminocarbonyl groups. Examples of these substituted substituents include methylsulfonylaminocarbonyl group, p-methylphenyl sulfonylaminocarbonyl group, acetylaminosulfonyl group, and benzoylaminosulfonyl group.

The term "ionic hydrophilic group" as used herein is meant to include anionic groups such as sulfo group, carboxyl group and phosphono group and cationic groups such as quaternary ammonium group. Preferred examples of the ionic hydrophilic groups include carboxyl groups, phosphono groups, and sulfo groups. Preferred among these ionic hydrophilic groups are carboxyl groups and sulfo groups. The carboxyl groups, phosphono groups, sulfo groups, etc. may be in the form of salt. Examples of counter ions constituting the salt include ammonium ions, alkaline metal ions (e.g., lithium ion, sodium ion, potassium ion), and organic cations (e.g., tetramethylammonium ion, tetramethylguanidinium ion, tetramethylphosphonium). Preferred among these counter ions are alkaline metal salts. Preferred among these alkaline metal salts are potassium ion, sodium ion, and lithium ion.

In the ink set of the invention, the magenta dye to be used as a colorant for magenta ink composition is represented by the general formula (1) or (2). Firstly, the compound represented by the following general formula (1) will be described below.

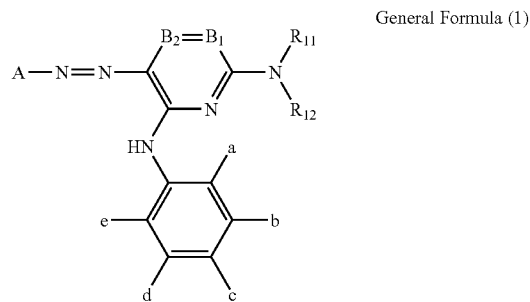

General Formula (1)

In the general formula (1), A represents a residue of 5-membered heterocyclic diazo component A-$NH_2$. $B_1$ and $B_2$ represent —$CR_{13}$= and —$CR_{14}$=, respectively, or one of $B_1$ and $B_2$ represents a nitrogen atom or the other represents —$CR_{13}$= or —$CR_{14}$=. $R_{11}$ and $R_{12}$ each independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. $R_{13}$ and $R_{14}$ each independently represent a hydrogen atom, halogen atom, aliphatic group, aromatic group, heterocyclic group, cyano group, carbamoyl group, alkoxycarbonyl group, aryloxycarbonyl group, acyl group, hydroxyl group, alkoxy group, aryloxy group, silyloxy group, acyloxy group, carbamoyloxy group, heterocyclic oxy group, alkoxycarbonyloxy group, aryloxycarbonyloxy group, amino group, acylamino group, aminocarbonylamino group, sulfamoylamino group, alkoxycarbonylamino group, aryloxycarbonylamino group, alkylsulfonylamino group, arylsulfonylamino group, nitro group, alkylthio group, arylthio group, alkylsulfonyl group, arylsulfonyl group, alkylsulfiyl group, arylsulfinyl group, sulfamoyl group, heterocyclic thio group or ionic hydrophilic group. $R_{13}$ and $R_{11}$ or $R_{11}$ and $R_{12}$ may be bonded to each other to form a 5- or 6-membered ring. The groups a and e each independently represent an alkyl group, alkoxy group or halogen atom. When a and e each are an alkyl group, the total number of carbon atoms constituting the alkyl group is 3 or more and the alkyl group may be further substituted. The groups b, c and d each have the same meaning as $R_{13}$ or $R_{14}$. The groups a and b or e and d may be condensed to each other. The general formula (1) has at least one ionic hydrophilic group.

Examples of the hetero atoms in the 5-membered heterocyclic group represented by A in the general formula (1) include N, O, and S. A is preferably a nitrogen-containing heterocyclic group to which aliphatic rings, aromatic rings or other heterocyclic groups may be condensed. Preferred examples of the heterocyclic group A include pyrazole rings, imidazole rings, triazole rings, thiazole rings, isothiazole rings, thiadiazole rings, benzothiazole rings, benzooxazole rings, and benzoisothiazole rings. These heterocyclic groups may further have substituents (aforementioned substituents W). In particular, heterocyclic groups represented by the following general formulae (a) to (i) are desirable.

(a) 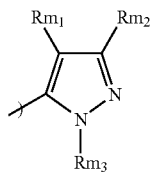

(b) 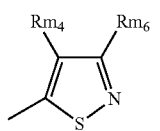

(c) 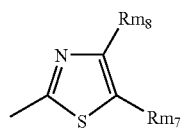

(d) 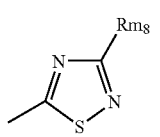

(e) 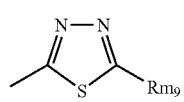

(f) 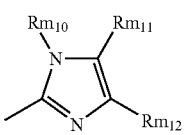

(g) 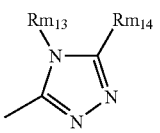

(h)

(i) 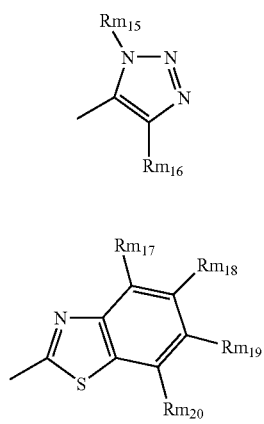

In the general formulae (a) to (i), $Rm_1$ to $Rm_{20}$ have the same meaning as $R_{13}$ and $R_{14}$ in the general formula (1).

In the general formula (1), $B_1$ and $B_2$ preferably represent —$CR_{13}$═ and —$CR_{14}$═, respectively, because a better performance can be attained.

In the general formula (1), $R_{11}$ and $R_{12}$ preferably each independently represent a hydrogen atom, substituted or unsubstituted cycloalkyl group, substituted or unsubstituted aryl group, substituted or unsubstituted heterocyclic group, substituted or unsubstituted acyl group, substituted or unsubstituted alkylsulfonyl group or substituted or unsubstituted arylsulfonyl group, more preferably a hydrogen atom, substituted aryl group or substituted heterocyclic group, particularly preferably a substituted aryl group or substituted heterocyclic group. However, $R_{11}$ and $R_{12}$ are not a hydrogen atom at the same time.

In the general formula (1), $R_{13}$ and $R_{14}$ preferably each independently represent a hydrogen atom, alkyl group, cyano group, carboxyl group, carbamoyl group or alkoxycarbonyl group. These groups may be further substituted. Preferred among these groups are hydrogen atom, alkyl group and cyano group. Among these combinations, $R_{13}$ is preferably a hydrogen atom and $R_{14}$ is preferably an alkyl group. In the most desirable combination, $R_{13}$ is a hydrogen atom and $R_{14}$ is a methyl group.

In the general formula (1), the groups a and e preferably each independently represent a methyl group, ethyl group or isopropyl group, more preferably an ethyl group or isopropyl group. Most preferably, the groups a and e are both an ethyl group or isopropyl group.

In the general formula (1), the group c is preferably a hydrogen atom or alkyl group, most preferably a hydrogen atom or methyl group. The groups b and d preferably each independently are a hydrogen atom or ionic hydrophilic group, more preferably a hydrogen atom, sulfo group or carboxyl group. In the most desirable combination, the group b is a hydrogen atom and the group d is a sulfonyl group.

In the invention, preferred among the compounds represented by the general formula (1) is one represented by the following general formula (4).

General Formula (4)

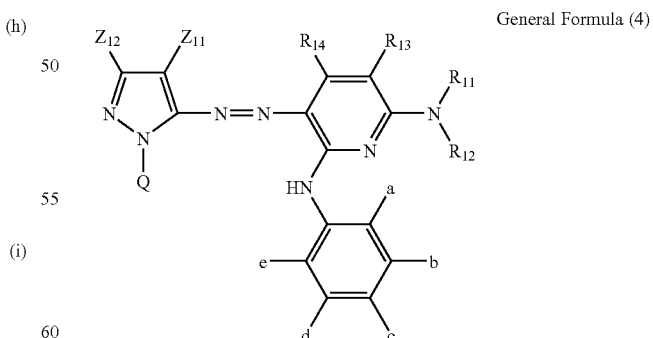

In the general formula (4), Z11 represents an electron withdrawing group having a Hammett's substituent constant σp value of 0.20 or more. $Z_{12}$ represents a hydrogen atom, aliphatic group, aromatic group, heterocyclic group or acyl group. $R_{11}$, $R_{12}$, $R_{13}$, $R_{14}$, a, b, c, d and e each are as defined in the general formula (1). Q represents a hydrogen atom, aliphatic group, aromatic group or heterocyclic group. However, the general formula (4) has at least one ionic hydrophilic group.

In the general formula (4), $R_{13}$ and $R_{14}$ each are as defined in the general formula (1), including their preferred examples.

In the general formula (4), $R_{11}$ and $R_{12}$ each are as defined in the general formula (1), including their preferred examples.

In the general formula (4), a, b, c, d and e are as defined in the general formula (1), including their preferred examples.

In the general formula (4), the electron withdrawing group $Z_{11}$ has a Hammett's substituent constant σp value of 0.20 or more, preferably 0.30 or more. The upper limit of σp value is preferably 1.0 or less.

The Hammett's substituent constant σp as used herein will be somewhat described hereinafter. Hammett's rule is an empirical rule which L. P. Hammett proposed in 1935 to quantitatively discuss the effect of substituents on the reaction or equilibrium of benzene derivatives, and the validity of this empirical rule has been widely accepted today. Substituent constants required in Hammett's rule are σp value and σm value, and these values are found in many general literatures, and for the details of these values, reference can be made to J. A. Dean, "Lange's Handbook of Chemistry", 12th ed., 1979 (Mc Graw-Hill), and "Kagaku no Ryoiki (Region of Chemistry)", extra edition, No. 122, pp. 96-103, 1979 (Nankodo). In the present invention, these substituents are defined or described by Hammett's substituent constant σp, but this doesn't mean that the known values found in the aforementioned literatures are not limited to certain substituents and it goes without saying that even if the values are unknown in literatures, they contain substituents which may fall within the defined range when measured according to Hammett's rule. In the invention, σp value is used in this sense.

Specific examples of the electron withdrawing group having a σp value of 0.20 or more include acyl groups, acyloxy groups, carbamoyl groups, alkoxycarbonyl groups, aryloxycarbonyl groups, cyano groups, nitro groups, dialkylphosphono groups, diarylphosphono groups, diaryl phosphinyl groups, alkylsulfinyl groups, arylsulfinyl groups, alkylsulfonyl groups, arylsulfonyl groups, sulfonyloxy groups, acylthio groups, sulfamoyl groups, thiocyanate groups, thiocarbonyl groups, halogenated alkyl groups, halogenated aryloxy groups, halogenated alkylamino groups, halogenated alkylthio groups, heterocyclic groups, halogen atoms, azo groups, selenocyanate groups, and aryl groups substituted by other electron withdrawing groups having a σp value of 0.20 or more.

$Z_{11}$ is preferably a cyano group, carbamoyl group, alkoxycarbonyl group, alkylsulfonyl group, arylsulfonyl group, nitro group or halogen atom, more preferably a cyano group, alkylsulfonyl group or arylsulfonyl group, most preferably a cyano group.

In the general formula (4), $Z_{12}$ is preferably a hydrogen atom, aliphatic group, aromatic group, heterocyclic group or acyl group, more preferably a hydrogen atom or alkyl group. These substituents may be further substituted. More particularly, $Z_{12}$ is preferably an alkyl group the number of carbon atoms of which, excluding the carbon atoms of the substituent, is from 1 to 12, more preferably from 1 to 6.

Examples of the alkyl group represented by $Z_{12}$ include methyl, ethyl, butyl, isopropyl, t-butyl, hydroxyethyl, methoxyethyl, cyanoethyl, trifluoromethyl, 3-sulfopropyl, and 4-sulfobutyl. Preferred among these alkyl groups are methyl, ethyl, isopropyl, and t-butyl. Particularly desirable among these alkyl groups are isopropyl and t-butyl. Most desirable among these alkyl groups is t-butyl.

In the general formula (4), Q is preferably an aryl group or heterocyclic group substituted by an electron withdrawing group. The electron withdrawing group which is a substituent on Q is an electron withdrawing group having a Hammett's substituent constant σp value of 0.20 or more, preferably 0.30 or more. The upper limit of Hammett's substituent constant σp value is preferably 1.0 or less. Specific examples of the electron withdrawing group having a σp value of 0.20 or more have the same meaning as $Z_{11}$ in the general formula (4). More particularly, Q is preferably a heterocyclic group substituted by an electron withdrawing group, more preferably a benzoxazole ring substituted by sulfo group, substituted or unsubstituted carbamoyl group or substituted or unsubstituted sulfamoyl group or benzothiazole ring substituted by sulfo group, substituted or unsubstituted carbamoyl group or substituted or unsubstituted sulfamoyl group, particularly preferably a benzothiazole ring substituted by sulfo group, substituted or unsubstituted carbamoyl group or substituted or unsubstituted sulfamoyl group.

The compounds represented by the general formulae (1) and (4) each have at least one ionic hydrophilic group per molecule. Examples of the ionic hydrophilic group include sulfo group, carboxyl group, phosphono group, and quaternary ammonium group. Preferred among these ionic hydrophilic groups are carboxyl group and sulfo group. In particular, one of the ionic hydrophilic groups is most preferably sulfo group. The carboxyl group, phosphono group and sulfo group may be in the form of salt. Examples of counter ions constituting the salt include ammonium ions, alkaline metal ions (e.g., lithium ion, sodium ion, potassium ion), and organic cations (e.g., tetramethylammonium ion, tetramethylguanidinium ion, tetramethylphosphonium). Preferred among these counter ions are alkaline metal salts. Preferred among these alkaline metal salts are potassium ion, sodium ion, and lithium ion. In particular, from the standpoint of solubility and inhibition of bronze during inkjet printing, a combination of sulfo group as ionic hydrophilic group and lithium ion as its counter ion is most desirable.

The compounds represented by the general formulae (1) and (4) each preferably have from not smaller than 3 to not greater than 6 ionic hydrophilic groups per molecule, more preferably from not smaller than 3 to not greater than 6 sulfonyl groups, even more preferably from not smaller than 3 to not greater than 5 sulfo groups per molecule.

Specific examples of represented by the general formulae (1) and (4) of the invention will be given below, but the invention is not limited thereto. For example, compounds disclosed in JP-A-2002-371079 and JP-A-2002-371214 or the following compounds d-1 to d-20 can be exemplified as preferred examples.

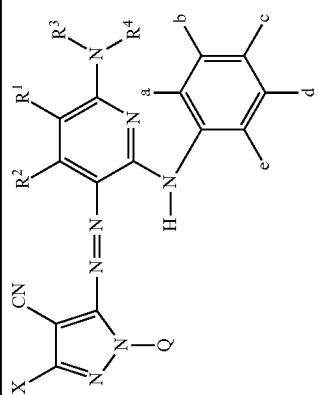
| Compound | X | Q | R¹ | R² | R³ | R⁴ | a | b | c | d | e |
|---|---|---|---|---|---|---|---|---|---|---|---|
| d-1 | 4-methylphenyl | 2-methylbenzothiazol-6-yl (SO₃H) | CN | CH₃ | H | 4-SO₃H-phenyl | CH₃ | H | SO₃H | H | C₂H₅ |
| d-2 | t-Bu | " | CONH₂ | H | " | 3,5-bis(1-methylethyl)-4-methylphenyl-SO₃H | iPr | " | " | " | iPr |
| d-3 | " | " | H | CH₃ | 2-methylbenzothiazol-6-yl (SO₃H) | " | " | " | " | " | " |
| d-4 | " | " | " | " | " | 3,5-diethyl-4-methylphenyl-SO₃H | C₂H₅ | " | " | " | C₂H₅ |

-continued

| | | | | | | | | | |
|---|---|---|---|---|---|---|---|---|---|
| d-5 | " | " | ![structure: 6-sulfo-2-methylbenzothiazole] | " | " | ![structure: 6-sulfo-2-methylbenzothiazole] | C₂H₅ | CH₃ | SO₃H | " |
| d-6 | t-Bu | H | CH₃ | ![structure: benzene with SO₃H, CH₃, CH(CH₃)₂] | CH₃ | H | SO₃H | iPr |
| d-7 | " | " | | " | ![structure: benzene with SO₃H, H₃C, H₃CO] | " | " | " | OCH₃ |
| d-8 | " | " | | " | ![structure: benzene with CH₃, SO₃H, Cl, H₃C] | " | CH₃ | SO₃H | Cl |
| d-9 | " | " | ![structure: benzothiazole-SO₂NH-benzene(COOH)₂] | " | " | ![structure: benzothiazole-SO₂NH-benzene(COOH)₂] | C₂H₅ | " | " | C₂H₅ |

-continued

| | | | | | | | | | |
|---|---|---|---|---|---|---|---|---|---|
| d-10 | " | " | " | " | " | " | iPr | iPr " SO$_3$H | iPr |

(structure for d-10: phenyl with SO$_3$H, two CH(CH$_3$) groups with H$_3$C, and CH$_3$)

General structure:

Pyrazole ring with X, CN, N–Q, connected via N=N azo to pyrimidine (B$_1$, B$_2$) with NR$_3$R$_4$ and NH-phenyl (positions a,b,c,d,e)

| Compound | Q | B$_1$ | B$_2$ | R$^3$ | R$^4$ | a | b | c | d | e |
|---|---|---|---|---|---|---|---|---|---|---|
| d-11 | 2-methylbenzoxazol-6-yl-SO$_3$H | N | C—CH$_3$ | H | (2,4-diethyl-6-methyl-3-SO$_3$H-phenyl with CH$_3$) | C$_2$H$_5$ | H | CH$_3$ | SO$_3$H | C$_2$H$_5$ |
| d-12 | 2-methylbenzothiazol-6-yl-SO$_3$H | " | C—NHCCH$_3$ (C=O) | " | " | " | " | " | " | " |

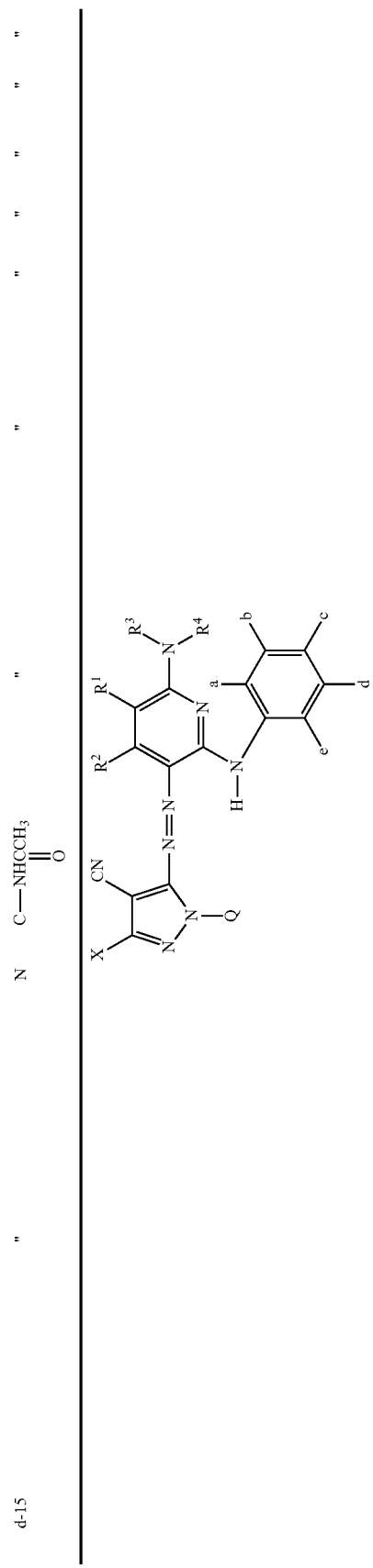

-continued
| | | | | |
|---|---|---|---|---|
| d-17 | 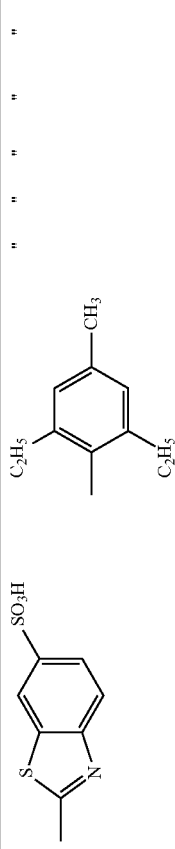 | " | " | " |
| d-18 | " | " | " | " |
| d-19 |  | " | 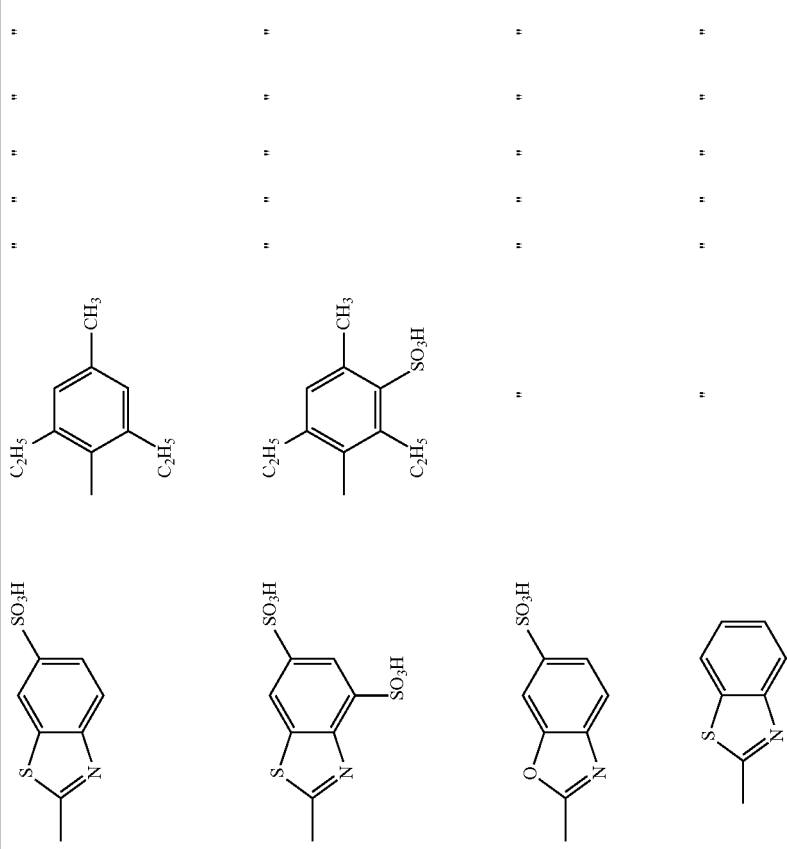 | " |
| d-20 | 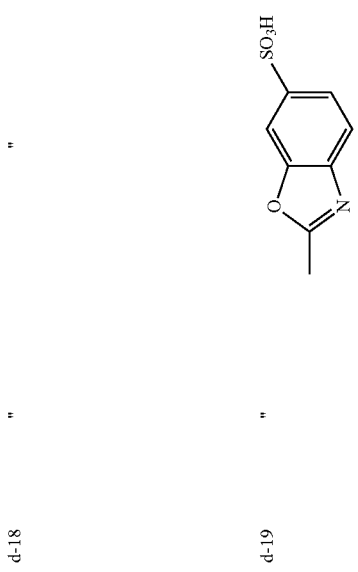 | " |  | " |

In the invention, even when there are tautomers depending on the structure of the compounds, they are shown in their typical form, but the tautomers which differ from the description of the invention are included in the compounds of the invention.

Referring to the ink set of the invention, the compound represented by the following general formula (2) to be used as a colorant for magenta ink composition will be described below.

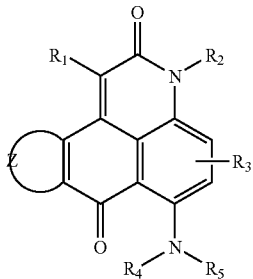

General Formula (2)

wherein $R_1$ represents a hydrogen atom or electron withdrawing group; $R_2$ and $R_3$ each independently represent a hydrogen atom or substituent; $R_4$ and $R_5$ each independently represent a hydrogen atom, aliphatic group, aromatic group or heterocyclic group; and Z represents a nonmetallic atom group required to form a 5- to 7-membered aromatic ring or heterocyclic ring with carbon atoms, with the proviso that the general formula (2) has at least one ionic hydrophilic group.

In the general formula (2), R1 is preferably a hydrogen atom or an electron withdrawing group having a Hammett's substituent constant σp value of 0.20 or more. Specific examples of the electron withdrawing group having a σp value of 0.20 or more have the same meaning as $Z_{11}$ in the general formula (4). $R_1$ is more preferably a hydrogen atom, acyl group, carbamoyl group, alkoxycarbonyl group, cyano group, nitro group, dialkylphosphono group, diarylphosphono group, diarylphosphinyl group, alkylsulfinyl group, arylsulfinyl group, alkylsulfonyl group, arylsulfonyl group, sulfonyloxy group, sulfamoyl group, halogenated alkyl group, heterocyclic group or halogen atom, particularly preferably a hydrogen atom, acyl group, alkoxycarbonyl group, cyano group, alkylsulfonyl group or arylsulfonyl group.

In the general formula (2), $R_2$ is preferably a hydrogen atom, alkyl group, aryl group or heterocyclic group. The heterocyclic group $R_2$ is preferably a 5- or 6-membered heterocyclic group which may be a monocyclic structure or a polycyclic structure having two or more rings condensed to each other. The heterocyclic group is preferably a heterocyclic group containing at least N, O and S atoms. Examples of the 5- or 6-membered heterocyclic group which is preferably used as heterocyclic group represented by $R_2$ include chenyl group, furyl group, pyrrolyl group, indolyl group, imidazolyl group, benzimidazolyl group, pyrazolyl group, indazolyl group, thiazolyl group, benzothiazolyl group, isothiazolyl group, benzoisothiazolyl group, oxazolyl group, benzooxazolyl group, isooxazolyl group, 1,2,4-thiadiazolyl group, 1,3,4-oxadiazolyl group, triazolyl group, pyridyl group, pyrazyl group, pyrimidyl group, pyridazine group, 1,3,5-triazyl group, quinolyl group, isoquinolyl group, and phthaladinyl group. These may have substituents (aforementioned substituents W). Two substituents on the heterocyclic group may be bonded to each other to form a condensed ring. In the case where the heterocyclic group contains nitrogen atoms, these nitrogen atoms may be quaterized.

$R_2$ is more preferably a hydrogen atom, alkyl group, aryl group, thiazolyl group, benzothiazolyl group or 1,3,5-triazine group, particularly preferably a hydrogen atom or methyl group.

In the general formula (2), $R_3$ is preferably a hydrogen atom, halogen atom, alkyl group, aryl group, alkoxy group, aryloxy group, amino group, carboxyl group or sulfo group, particularly preferably a hydrogen atom or aryloxy group.

In the general formula (2), $R_4$ and $R_5$ preferably each independently are a hydrogen atom or aromatic group. In a particularly preferred combination, one of R4 and R5 is a hydrogen atom and the other is a substituted aryl group.

In the general formula (2), Z represents a nonmetallic atom group required to form a 5- to 7-membered aromatic ring or heterocyclic ring with carbon atoms. The 5- to 7-membered aromatic ring may further have substituents (aforementioned substituents W). Examples of the 5- to 7-membered heterocyclic group formed by Z with carbon atoms include thiophene rings, furane rings, pyrrole rings, indole rings, imidazole rings, pyrazole rings, indazole rings, thiazole rings, isothiazole rings, oxazole rings, isooxazole rings, pyridine rings, pyrazine rings, pyrimidine rings, and pyridazine rings.

Preferred among the aforementioned 5- to 7-membered aromatic ring or heterocyclic group formed by Z with carbon atoms are benzene rings, thiophene rings, furane rings and pyridine rings. An anthrapyridone compound represented by the following general formula (5) the aromatic ring of which formed by Z with carbon atoms is a benzene ring is particularly preferred.

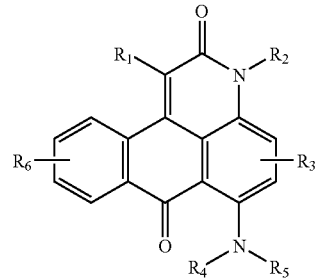

General Formula (5)

In the general formula (5), $R_6$ represents a hydrogen atom or substituent (aforementioned substituent W). $R_6$ is preferably a hydrogen atom, halogen atom, alkyl group, aryl group, amino group, carboxyl group or sulfo group, particularly preferably a hydrogen atom.

In the general formula (5), $R_1$ to $R_5$ each are as defined in the general formula (2), including their preferred range.

The compounds represented by the general formulae (2) and (5) each have at least one ionic hydrophilic group per molecule. As the ionic hydrophilic group there is preferably used a carboxyl group, phosphono group or sulfo group, particularly preferably a carboxyl group or sulfo group. In particular, one of the ionic hydrophilic groups is most preferably sulfo group. The carboxyl group, phosphono group and sulfo group may be in the form of salt. Examples of counter ions constituting the salt include ammonium ions, alkaline metal ions (e.g., lithium ion, sodium ion, potassium ion), and organic cations (e.g., tetramethylammonium ion, tetramethylguanidinium ion, tetramethylphosphonium). Preferred among these counter ions are alkaline metal salts.

The aforementioned compound preferably has from not smaller than 2 to not greater than 6 ionic hydrophilic groups, more preferably from not smaller than 3 to not greater than 5 ionic hydrophilic groups per molecule.

Specific examples of the compounds represented by the general formulae (2) and (5) of the invention will be given below, but the invention is not limited thereto. For example, compounds disclosed in JP-A-2003-1929304, International Publication (WO) No. 2004/104108 pamphlet, JP-A-2001-072884, JP-A-2002-332418, JP-A-2002-332418, JP-A-2005-008868, JP-A-2005-041846, JP-A-2005-139377 and International Publication (WO) No. 2004/104107 pamphlet, or the following compounds D-1 to D-18 can be exemplified as preferred examples.

(D-1)
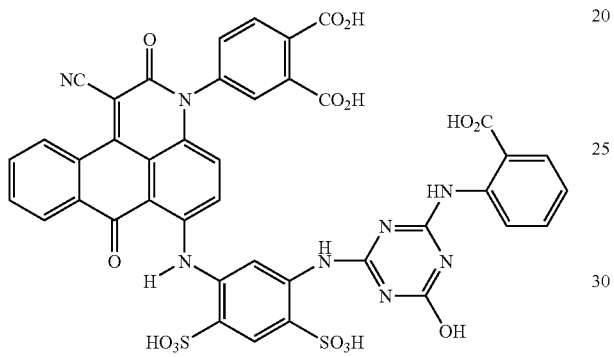

(D-2)
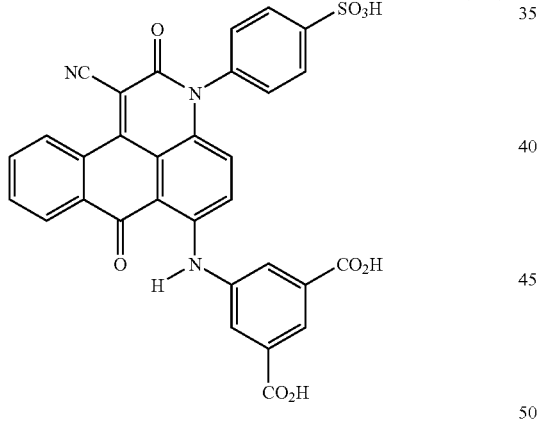

(D-3)
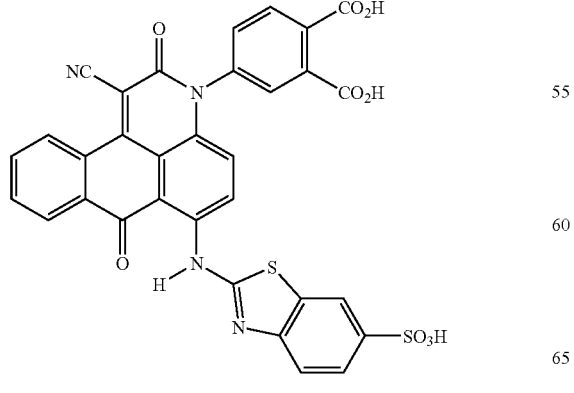

(D-4)
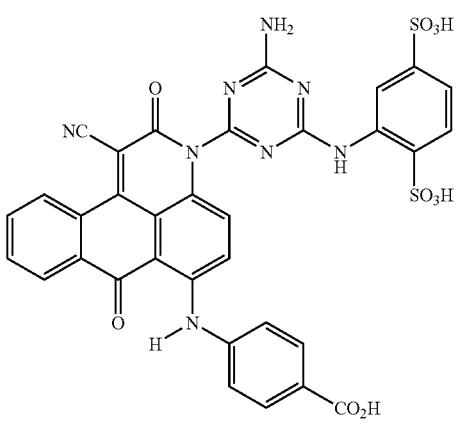

(D-5)
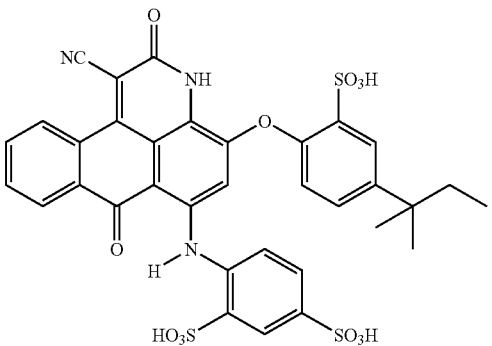

(D-6)
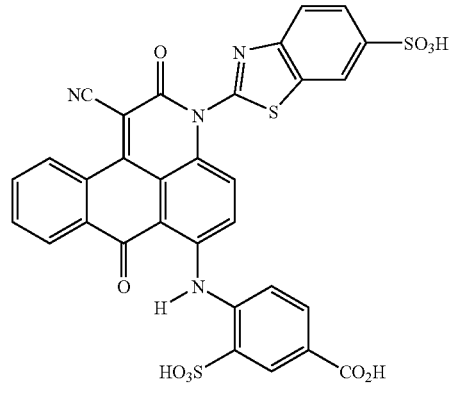

(D-7)
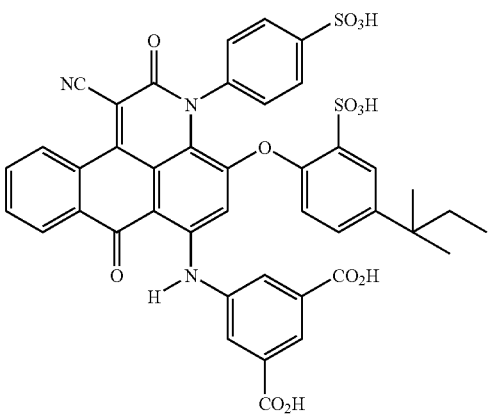

-continued
(D-8)
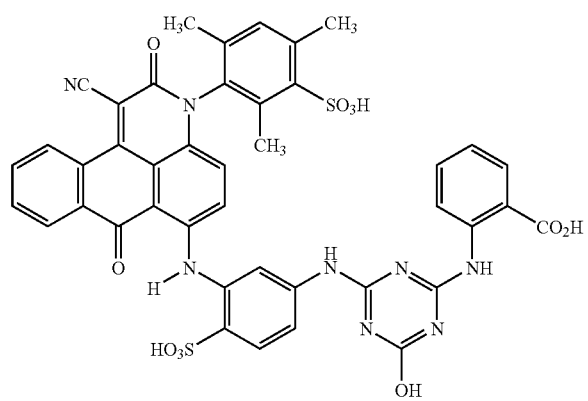
(D-9)
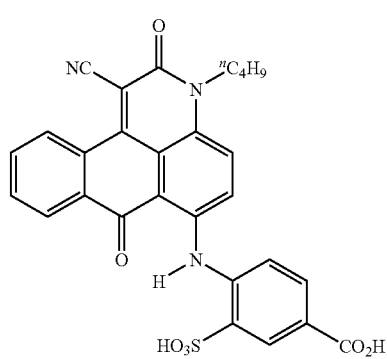
(D-10)
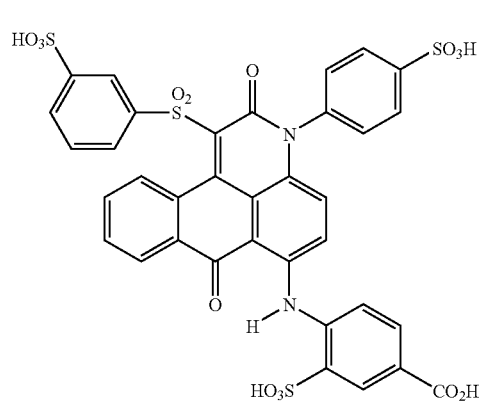
(D-11)
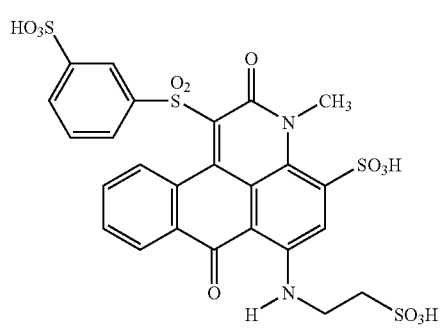
-continued
(D-12)
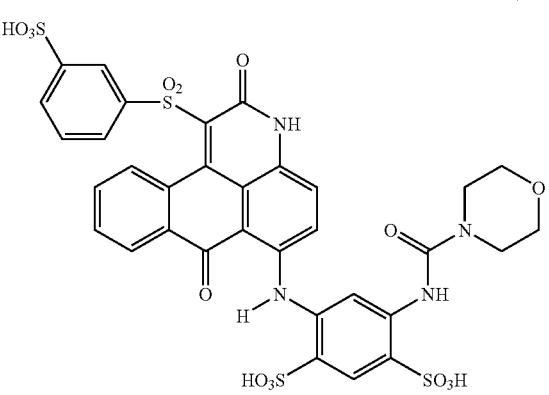
(D-13)
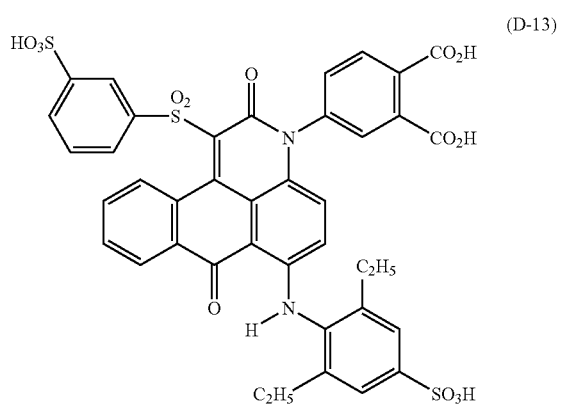
(D-14)
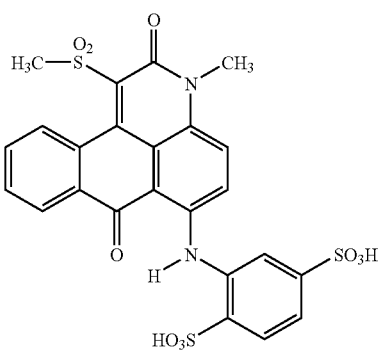
(D-15)
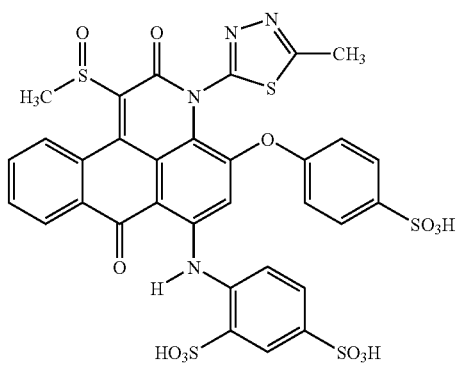

-continued (D-16)
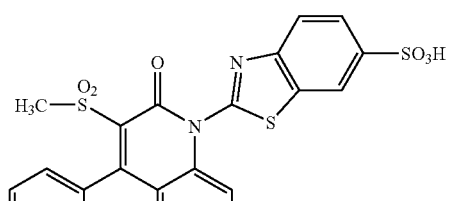

(D-17)
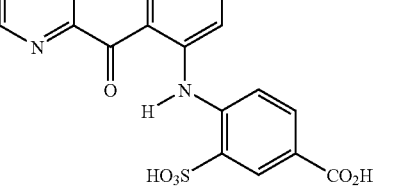

(D-18)
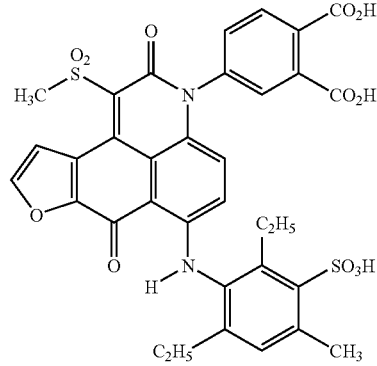

The cyan dye to be used as a colorant for cyan ink composition incorporated in the ink set of the invention is a phthalocyanine compound that meets the following requirements 1 and 2.
Requirement 1: The ratio b/a of the maximum absorbance b within the absorption band of from 660 nm to 680 nm to the maximum absorbance a within the absorption band of from 600 nm to 640 nm on the spectral absorption curve of aqueous solution is less than 1; and
Requirement 2: The oxidation potential is more positive than 1.0 eV (vsSCE).

Methods for measurement of absorbance ratio and oxidation potential described in the aforementioned Requirements 1 and 2 are described in detail in JP-A-2002-285050 and JP-A-2002-309118.

As a colorant, any phthalocyanine compound having an absorbance ratio b/a of less than 1 as defined in Requirement 1 can form an image having a good fastness. However, the absorbance ratio b/a is preferably less than 0.8, particularly preferably 0.6 or less.

The oxidation potential value as defined in Requirement 2 is preferably as more positive as possible, more preferably more positive than 1.1 V (vsSCE), most preferably more positive than 1.15 (vsSCE).

The cyan-based dye to be used as a colorant for the cyan ink composition in the invention is preferably a phthalocyanine compound represented by the following general formula (3) that meets Requirements 1 and 2. The general formula (3) will be further described below.

General Formula (3)
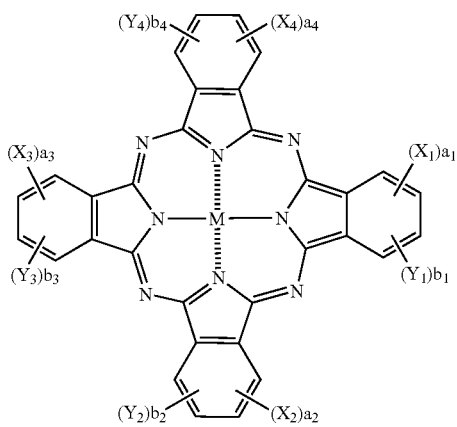

In the general formula (3), $X_1$, $X_2$, $X_3$ and $X_4$ each independently represent any of —SO—Z, —$SO_2$—Z, —$SO_2NV_1V_2$, —$CONV_1V_2$, —$CO_2Z$, —CO—Z and sulfo group in which Z's each independently represent a substituted or unsubstituted aliphatic group, substituted or unsubstituted aromatic group or substituted or unsubstituted heterocyclic group and $V_1$ and $V_2$ may be the same or different and each represent a hydrogen atom, substituted or unsubstituted aliphatic group, substituted or unsubstituted aromatic group or substituted or unsubstituted heterocyclic group.

$Y_1$, $Y_2$, $Y_3$ and $Y_4$ each independently represent a hydrogen atom, halogen atom, aliphatic group, aromatic group, heterocyclic group, cyano group, hydroxyl group, nitro group, amino group, alkylamino group, alkoxy group, aryloxy group, amide group, arylamino group, aminocarbonylamino group, sulfamoylamino group, alkylthio group, arylthio group, alkoxycarbonylamino group, sulfonamide group, carbamoyl group, sulfamoyl group, alkoxycarbonyl group, heterocyclic oxy group, azo group, acyloxy group, carbamoyloxy group, silyloxy group, aryloxycarbonyl group, aryloxycarbonylamino group, imido group, heterocyclic thio group, phosphoryl group, acyl group or ionic hydrophilic group.

The suffixes $a_1$ to $a_4$ and $b_1$ to $b_4$ each represent the number of substituents on $X_1$ to $X_4$ and $Y_1$ to $Y_4$, respectively, with the proviso that $a_1$ to $a_4$ each independently represent an integer of from 0 to 4 and are not 0 at the same time and $b_1$ to $b_4$ each independently represent an integer of from 0 to 4.

M represents a hydrogen atom, metal atom or oxide, hydroxide or halide thereof, with the proviso that at least one of $X_1$, $X_2$, $X_3$, $X_4$, $Y_1$, $Y_2$, $Y_3$ and $Y_4$ is an ionic hydrophilic group or a group having an ionic hydrophilic group as substituent.

In the general formula (3), $a_1$, $a_2$, $a_3$ and $a_4$ each are preferably 0 or 1. Further, two or more of $a_1$, $a_2$, $a_3$ and $a_4$ each are 1. Moreover, $b_1$, $b_2$, $b_3$ and $b_4$ each are an integer such that they make 4 with $a_1$, $a_2$, $a_3$ and $a_4$, respectively.

In the general formula (3), $X_1$, $X_2$, $X_3$ and $X_4$ each independently represent any of —SO—Z, —SO$_2$—Z, —SO$_2$NV$_1$V$_2$, —CONV$_1$V$_2$, —CO$_2$Z, —CO—Z and sulfo group.

Z is preferably a substituted or unsubstituted alkyl group, substituted or unsubstituted aryl group or substituted or unsubstituted heterocyclic group. More desirable among these groups are substituted alkyl group, substituted aryl group and substituted heterocyclic group. Most desirable among these groups is substituted alkyl group.

$V_1$ and $V_2$ each are preferably a hydrogen atom, substituted or unsubstituted alkyl group, substituted or unsubstituted aryl group or substituted or unsubstituted heterocyclic group. Most desirable among these groups are hydrogen atom, substituted alkyl group, substituted aryl group and substituted heterocyclic group.

The substituted or unsubstituted aliphatic groups represented by Z, $V_1$ and $V_2$ each are preferably a $C_1$-$C_{50}$ aliphatic group. In particular, for the reason that the solubility of dye and the ink stability can be raised, an aliphatic group having carbon chains as branch is preferred. An aliphatic group having asymmetric carbon atoms (used in the form of racemate) is particularly preferred. As the substituents on the aliphatic group there are particularly preferably used hydroxyl groups, alkoxy groups, alkoxycarbonyl groups, cyano groups, amino groups, amido groups or sulfamoyl groups because they enhance the associating properties of dye and hence the image fastness. The aliphatic group may have halogen atoms or ionic hydrophilic groups besides these substituents.

The substituted or unsubstituted aromatic groups represented by Z, $V_1$ and $V_2$ each are preferably a $C_6$-$C_{30}$ aromatic group. As the substituents on the aromatic group there are particularly preferably electron withdrawing groups because they make the oxidation potential of dye more positive and thus enhance the image fastness.

The substituted heterocyclic groups represented by Z, $V_1$ and $V_2$ each are preferably a 5- or 6-membered ring which may be further condensed. The 5- or 6-membered ring may be an aromatic heterocyclic group or non-aromatic heterocyclic group. The heterocyclic groups represented by Z, $V_1$ and $V_2$ will be exemplified in heterocyclic form free of substitution site, but the substitution site is not limited. Pyridine, for example, can be substituted in 2-position, 3-position or 4-position. Examples of the heterocyclic groups represented by Z, $V_1$ and $V_2$ include pyridine, pyrazine, pyrimidine, pyridazine, triazine, quinoline, isoquinoline, quinazoline, cinnoline, phthaladine, quinoxaline, pyrrole, indole, furane, benzofurane, thiophene, benzothiophene, pyrazole, imidazole, benzimidazole, triazole, oxazole, benzoxazole, thiazole, benzothiazole, isothiazole, benzisothiazole, thiadiazole, isooxaole, benziosooxazole, pyrrolidine, piperidine, piperadine, imidazolidine, and thiazoline. Preferred among these heterocyclic groups are aromatic heterocyclic groups. Exemplifying their preferred examples in the same manner as above, pyridine, pyrimidine, pyridazine, triazine, pyrazole, imidazole, benzimidazole, triazole, thiazole, benzothiazole, isothiazole, benzisothiazole, and thiazoline are used. They may have substituents (aforementioned substituents W) and are preferably substituted by an electron withdrawing group.

The phthalocyanine dye of the invention, if it is water-soluble, preferably has an ionic hydrophilic group. As the ionic hydrophilic group there is preferably used a carboxyl group, phosphono group or sulfo group, particularly preferably a carboxyl group or sulfo group. The carboxyl groups, phosphono groups and sulfo groups may be in the form of salt. Examples of counter ions constituting the salt include ammonium ions, alkaline metal ions (e.g., lithium ion, sodium ion, potassium ion), and organic cations (e.g., tetramethylammonium ion, tetramethylguanidinium ion, tetramethylphosphonium). Preferred among these counter ions are alkaline metal salts. Lithium salt is particularly preferred because it enhances the solubility of dye and hence the stability of ink. The most desirable ionic hydrophilic group is a lithium salt of sulfo group.

The number of ionic hydrophilic groups is preferably at least 2 per molecule of phthalocyanine dye of the invention. Particularly preferably, the phthalocyanine dye has at least two of sulfo groups and/or carboxyl groups.

Preferred examples of M include hydrogen atom, and metal atoms such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi. Examples of the metal oxide include VO and GeO. Examples of the metal hydroxide include Si(OH)$_2$, Cr(OH)$_2$, and Sn(OH)$_2$. Examples of the metal halide include AlCl, SiCl$_2$, VCl, VCl$_2$, VOCl, FeCl, GaCl, and ZrCl. Particularly preferred among these metals Cu, Ni, Zn, and Al. Most desirable among these metals is Cu.

Referring to the chemical structure of the phthalocyanine dye of the invention, it is particularly preferred that at least one electron withdrawing group such as sulfinyl group (—SO—Z), sulfonyl group (—SO$_2$—Z), sulfamoyl group (—SO$_2$NV$_1$V$_2$), carbamoyl group (—CONV$_1$V$_2$), alkoxycarbonyl group, aryloxycarbonyl group, heterocyclic oxycarbonyl group (—CO$_2$Z), acyl group (—CO—Z) and sulfo group be introduced into each of benzene rings in the phthalocyanine of the invention such that the substituent σp value of the entire phthalocyanine skeleton reaches 1.2 or more in total. Preferred among these electron withdrawing groups are sulfinyl group (—SO—Z), sulfonyl group (—SO$_2$Z) and sulfamoyl group (—SO$_2$NV$_1$V$_2$). More desirable among these electron withdrawing groups are sulfonyl group (—SO$_2$Z) and sulfamoyl group (—SO$_2$NV$_1$V$_2$). Most desirable among these electron withdrawing groups is sulfonyl group (—SO$_2$Z).

Particularly preferred among the phthalocyanine compounds represented by the general formula (3) is one represented by the following general formula (6).

General Formula (6)

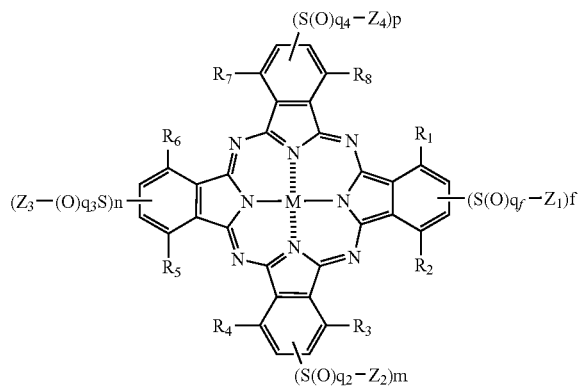

In the general formula (6), $R_1$, $R_2$, $R_3$, $R_4$, $R_5$, $R_6$, $R_7$ and $R_8$ each independently represent a hydrogen atom, halogen atom, aliphatic group, aromatic group, heterocyclic group, cyano group, hydroxyl group, nitro group, amino group, alkylamino group, alkoxy group, aryloxy group, amido group, arylamino group, aminocarbonylamino group, sulfamoylamino group, alkylthio group, arylthio group, alkoxycarbonylamino group, sulfonamido group, carbamoyl group, sulfamoyl group, sulfinyl group, sulfonyl group, alkoxycarbonyl group, heterocyclic oxy group, azo group, acyloxy group, carbamoyloxy group, silyloxy group, aryloxycarbonyl group, aryloxycarbonylamino group, imido group, heterocyclic thio group, phosphoryl group, acyl group or ionic hydrophilic group. These groups may further have substituents (aforementioned substituents W).

$Z_1$, $Z_2$, $Z_3$ and $Z_4$ each independently represent a substituted or unsubstituted aliphatic group, substituted or unsubstituted aromatic group or substituted or unsubstituted heterocyclic group. However, at least one of $Z_1$, $Z_2$, $Z_3$ and $Z_4$ has an ionic hydrophilic group as a substituent.

The suffixes l, m, n, p, $q_1$, $q_2$, $q_3$ and $q_4$ each independently represent an integer of 1 or 2. M is as defined in the general formula (3).

In the general formula (6), two or more of l, m, n and p each are preferably 1. Most preferably, l, m, n and p each are 1.

In the general formula (6), two or more of $q_1$, $q_2$, $q_3$ and $q_4$ each are preferably 2. Most preferably, $q_1$, $q_2$, $q_3$ and $q_4$ each are 2.

In the general formula (6), $Z_1$, $Z_2$, $Z_3$ and $Z_4$ preferably each represent a substituted or unsubstituted alkyl group, substituted or unsubstituted aryl group or substituted or unsubstituted heterocyclic group. Preferred among these groups are substituted alkyl group, substituted aryl group and substituted heterocyclic group. Most desirable among these groups is substituted alkyl group. However, at least one of $Z_1$, $Z_2$, $Z_3$ and $Z_4$ has an ionic hydrophilic group as a substituent.

In the general formula (6), $R_1$, $R_2$, $R_3$, $R_4$, $R_5$, $R_6$, $R_7$ and $R_8$ preferably each represent a hydrogen atom, halogen atom, alkyl group, aryl group, heterocyclic group, cyano group, hydroxyl group, nitro group, carbamoyl group, sulfamoyl group, sulfinyl group, sulfonyl group, alkoxycarbonyl group, aryloxycarbonyl group, phosphoryl group, acyl group or ionic hydrophilic group, more preferably a hydrogen atom, halogen atom, cyano group, hydroxyl group, sulfamoyl group, sulfinyl group, sulfonyl group or ionic hydrophilic group, most preferably a hydrogen atom.

In the general formula (6), M has the same meaning as M in the general formula (3), including its preferred examples.

Specific preferred examples of the compounds represented by the general formulae (3) and (6) of the invention include compounds disclosed in JP-A-2002-285050, JP-A-2002-309118, JP-A-2004-002670, International Publication (WO) No. 2004/085541, pamphlet and JP-A-2004-323605, but the compounds employable herein are not limited thereto.
JP-A-2002-285050: Compounds 101 to 143 disclosed in paragraphs 0173-0183
JP-A-2002-309118: Compounds 101 to 175 disclosed in paragraphs 0195-0204
JP-A-2004-002670: Compounds 101 to 145 disclosed in paragraphs 0208-0216; Compounds 146 to 150 disclosed in paragraph 0219; Compounds 151 to 155 disclosed in paragraph 0222
International Publication (WO) No. 2004/085541, pamphlet: Compound Nos. 1 to 55
(Purpose of Coloring Composition)

The coloring composition of the invention is used for an image recording material for forming an image, particularly a color image. Specific examples of the image recording material include inkjet recording materials described in detail below, heat-sensitive transfer type image recording materials, pressure-sensitive recording materials, recording materials using electrophotography, transfer type silver halide photographic materials, printing inks, and recording pens. Preferred among these image recording materials are inkjet recording materials, heat-sensitive transfer type image recording materials, and recording materials using electrophotography. More desirable among these recording materials are inkjet recording materials. The coloring composition of the invention can be applied to color filter for use in solid state image pickup devices such as LCD and CCD disclosed in U.S. Pat. No. 4,808,501 and JP-A-6-35182 and dye solution for dyeing various fibers.

The colorant of the invention can be adjusted with substituent to physical properties such as solubility and heat transferability suitable for its purpose. Further, the colorant of the invention can be used in the form of uniform solution, dispersed solution like emulsion dispersion, even solid dispersion depending on the system in which it is used.
(Ink Composition for Inkjet Recording)

The ink composition for inkjet recording can be prepared by dissolving and/or dispersing the colorant compound of the invention in a lipophilic medium or aqueous medium. Preferably, an aqueous medium is used. If necessary, other additives may be incorporated in the solution or dispersion to an extent such that the effect of the invention cannot be impaired. Examples of the other additives include known additives such as dry inhibitor (wetting agent), fading inhibitor, emulsion stabilizer, penetration accelerator, ultraviolet absorber, preservative, mildewproofing agent, pH adjustor, surface tension adjustor, antifoaming agent, viscosity adjustor, dispersant, dispersion stabilizer, rust preventive and chelating agent (Those disclosed in JP-A-2002-371214 can be applied). These various additives are directly added to the ink solution which is then used as a water-soluble ink. If the oil-soluble colorant is used in the form of dispersion, it is normally added to the colorant dispersion thus prepared but may be added to the oil phase or aqueous phase during preparation.

As the aqueous medium there may be used a medium mainly composed of water optionally mixed with a water-miscible organic solvent. Examples of the water-miscible organic solvent employable herein include alcohols (e.g., methanol, ethanol, propanol, isopropanol, butanol, isobutanol, sec-butanol, t-butanol, pentanol, hexanol, cyclohexanol, benzyl alcohol), polyvalent alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexane triol, thiodiglycol), glycol derivatives (e.g., ethylene glycol monobutyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanol amine, N-ethyldiethanolamine, morpholine, N-ethyl morpholine, ethylenediamine, diethylenetriamine, triethylenetetramine, polyethyleneimine, tetramethyl propylenediamine), and other polar solvents (e.g., formamide, N,N-dimethylformamide, N,N-dimethyl acetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents may be used in combination of two or more thereof.

The ink set of the invention may comprise a dark magenta ink composition and a light magenta ink composition incorporated therein as magenta ink composition. In the case where both the dark magenta ink composition and the light magenta ink composition are incorporated in the ink set, at least one of the two magenta ink compositions preferably contains compounds of the general formulae (1) and (2) as colorant. More preferably, the light magenta ink composition contains compounds of the general formulae (1) and (2) as colorant. Most preferably, both the dark magenta ink composition and the light magenta ink composition contain compounds of the general formulae (1) and (2) as colorant.

In the ink for inkjet recording of the invention, the concentration of magenta dye in the magenta ink composition can be properly determined according to the color value of the dyes used. In general, the total concentration of magenta compounds represented by the general formulae (1) and (2) per 100 parts by mass of ink for inkjet recording is preferably from 0.2 to 10 parts by mass. When the concentration of colorant (dye) is 0.2% by mass or more, the resulting ink can be provided with sufficient color-developability. Further, when the concentration of colorant (dye) is 10% by mass or more, the resulting ink composition for inkjet recording can be easily provided with ejectability from nozzle and cannot clog the nozzle.

The mass ratio of the compound represented by the general formula (1) to the compound represented by the general formula (2) in the magenta ink composition is not specifically limited but is preferably from 4:1 to 1:8, particularly preferably from 1:1 to 1:4.

Further, as the colorants for magenta ink composition there may be used other magenta dyes in addition to the magenta compounds (dyes) represented by the general formulae (1) and (2). In the case where three or more colorants are used in combination, the total content of the colorants preferably falls within the above defined range.

Examples of the magenta dyes to be used in combination with the magenta dyes represented by the general formulae (1) and (2) include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, 247, C.I. Direct Violet 7, 9, 47, 48, 51, 66, 90, 93, 94, 95, 98, 100, 101, Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397, C.I. Acid Violet 5, 34, 43, 47, 48, 90, 103, 126, C.I. Reactive Red 3, 13, 17, 19, 21, 22, 23, 24, 29, 35, 37, 40, 41, 43, 45, 49, 55, C.I. Reactive Violet 1, 3, 4, 5, 6, 7, 8, 9, 16, 17, 22, 23, 24, 26, 27, 33, 34, C.I. Basic Red 12, 13, 14, 15, 18, 22, 23, 24, 25, 27, 29, 35, 36, 38, 39, 45, 46, and C.I. Basic Violet 1, 2, 3, 7, 10, 15, 16, 20, 21, 25, 27, 28, 35, 37, 39, 40, 48. Examples of the coupling component (hereinafter referred to as "coupler component") include phenols, naphthols, anilines, heterocyclic groups such as pyrazine, aryl or heterylazo dyes having open-chain type active methylene compounds or the like, azomethine dyes having open-chain type active methylene compounds as coupler component, and anthrapyridone dyes.

A further example of the magenta dye to be used in combination with the magenta colorants (dyes) represented by the general formulae (1) and (2) is a compound represented by the following general formula (7).

General Formula (7)

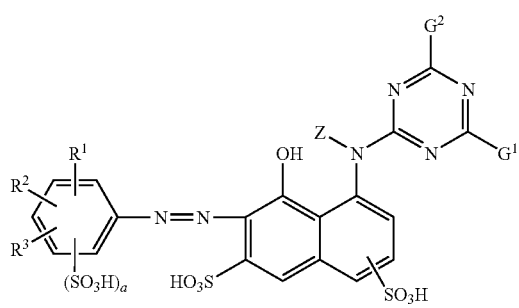

In the general formula (7), $R^1$, $R^2$ and $R^3$ each independently represent a hydrogen atom, halogen atom, hydroxyl group, carboxyl group, nitro group, $C_1$-$C_9$ alkyl group which may be substituted, $C_1$-$C_9$ alkoxy group, carbamoyl group which may be substituted, sulfamoyl group which may be substituted, amino group which may be substituted, sulfonic acid ester group, $C_1$-$C_9$ alkylsulfonyl group, $C_6$-$C_{15}$ arylsulfonyl group or alkoxycarbonyl group. The suffix a represents 0, 1 or 2. Z represents a hydrogen atom or $C_1$-$C_4$ alkyl group. $G^1$ and $G^2$ each independently represent a halogen atom or a group represented by $NR^4R^5$ or $OR^6$ in which $R^4$, $R^5$ and $R^5$ each independently represent a hydrogen atom or a $C_1$-$C_{18}$ alkyl group, $C_2$-$C_{18}$ alkenyl group, aralkyl group, aromatic hydrocarbon ring or heterocyclic group which may be substituted.

In the case where the magenta dyes represented by the general formulae (1) and (2) are used in combination with other magenta dyes as colorant to prepare a magenta ink composition, the ratio of the total mass of the magenta dyes represented by the general formulae (1) and (2) to the mass of the magenta dye to be used in combination therewith is not specifically limited but is preferably from 50/50 to 95/5, more preferably from 70/30 to 90/10.

Further, the magenta ink composition of the invention may comprise a betaine-based surface active agent incorporated therein in combination with the magenta dyes represented by the general formulae (1) and (2). Specific examples of the betaine-based surface active agent employable herein include those disclosed in International Publication No. 03/066756 pamphlet. The betaine-based surface active agent is preferably incorporated in an amount of from 0.02 to 20 parts by mass based on 100 parts by mass of ink for inkjet recording. Further, a plurality of betaine-based surface active agents having different structures may be used in combination. In this case, the total content of the betaine-based surface active agents preferably falls within the above defined range.

The ink set of the invention may comprise a dark cyan ink composition and a light cyan ink composition incorporated therein as cyan ink composition. In the case where both the dark cyan ink composition and the light cyan ink composition are incorporated in the ink set, at least one of the dark cyan ink composition and the light cyan ink composition preferably contains a compound (dye) of the general formula (3) or (6) as a colorant. More preferably, the light cyan ink composition contains a dye of the general formula (3) or (6) as a colorant. Most preferably, both the dark cyan ink composition and the light cyan ink composition contain a compound (dye) of the general formula (3) or (6).

In the ink for inkjet recording of the invention, the concentration of cyan dye in the cyan ink composition can be properly determined according to the color value of the dye used. In general, the compound (cyan dye) represented by the general formula (3) or (6) is preferably incorporated in an amount of from 02 to 10 parts by mass based on 100 parts by mass of ink for inkjet recording.

Further, as the colorants for cyan ink composition there may be used other cyan dyes in addition to the cyan compound represented by the general formula (3) or (6). In the case where three or more colorants are used in combination, the total content of the colorants preferably falls within the above defined range.

As the cyan dye to be used in combination with the compound (cyan dye) represented by the general formula (3) or (6) there may be used an arbitrary cyan dye. Specific examples of the cyan dye employable herein include C. I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291, C. I. Acid Blue 9, 25, 40, 41, 62, 72, 76, 78, 80, 82, 92, 106, 112, 113, 120, 127, 128, 129, 138, 143, 175, 181, 205, 207, 220, 221, 230, 232, 247, 258, 260, 264, 271, 277, 278, 279, 280, 288, 290, 326, C. I. Reactive Blue 2, 3, 5, 8, 10, 13, 14, 15, 17, 18, 19, 21, 25, 26, 27, 28, 29, 38, C. I. Basic Blue 1, 3, 5, 7, 9, 22, 26, 41, 45, 46, 47, 54, 57, 60, 62, 65, 66, 69, and hydrolyzates thereof. Further examples of cyan dyes include aryl or heterylazo dyes having phenols, naphthols or anilines as coupler components, azomethine dyestuffs having heterocycles such as phenol, naphthol and pyrrolotriazole as coupler components, polymethine dyes such as cyanine dyes, oxonol dyes and melocyanine dyes, carbonium dyes such as diphenylmethane dyes, triphenylmethane dyes and xanthene dyes, phthalocyanine dyes, anthraquinone dyes, and indigo-thioindigo dyes.

The aforementioned cyan dyes may assume their cyan hues only when chromophore is partly dissociated. In this case, the counter cation may be an inorganic cation such as alkaline metal ion and ammonium ion or an organic cation such as pyridinium ion and quaternary ammonium salt ion or may be contained in a polymer cation as a partial structure.

In the case where the central metal of the compound (phthalocyanine dye) represented by the general formula (3) or (6) is copper, the concentration of free copper ions in the cyan ink composition is 10 ppm or less, more preferably 5 ppm or less. As a method for controlling the concentration of free copper ions there may be used a method which comprises raising the degree of purification of the colorant or a method which comprises blocking copper ions with a metal ion blocking agent. Preferred examples of the metal ion blocking agent employable herein include ethylenediaminetetraacetic acid (EDTA), nitrilotriacetic acid, hydroxyethyl ethylenediaminotriacetic acid, uramildiacetic acid, and metal salts thereof (e.g., sodium salt).

When the concentration of free copper ions falls within the above defined range, the production of precipitates after ink production can be prevented. In addition, good preservability, ejection stability and effect of preventing clogging can be obtained.

The concentration of free copper ions can be measured by ion chromatography, inductively coupled plasma mass spectrometry (ICP-MS), capillary electrophoresis or the like.

The ink for inkjet recording of the invention may be used to form not only a monochromatic image but also a full-color image. In order to form a full-color image, a magenta-toned ink composition, a cyan-toned ink composition and a yellow-toned ink composition may be used. Further, a black-toned ink composition may be used to adjust color tone.

The yellow dye to be used as a colorant for the yellow ink composition in the ink set of the invention is not specifically limited and may be arbitrary. Examples of the yellow dye employable herein include C. I. Direct Yellow 8, 9, 11, 12, 27, 28, 29, 33, 35, 39, 41, 44, 50, 53, 58, 59, 68, 86, 87, 93, 96, 98, 100, 106, 108, 109, 110, 130, 132, 142, 144, 161, 163, C.I. Acid yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227, C.I. Reactive Yellow 2, 3, 13, 14, 15, 17, 18, 23, 24, 25, 26, 27, 29, 35, 37, 41, 42, and C.I. Basic Yellow 1, 2, 4, 11, 13, 14, 15, 19, 21, 23, 24, 25, 28, 29, 32, 36, 39, 40. Examples of the coupling component include phenols, naphthols, anilines, heterocyclic groups such as pyrazolone and pyridone, aryl or heterylazo dyes having open-chain type active methylene compounds or the like, azomethine dyes having open-chain type active methylene compounds as coupler component, methine dyes such as benzylidene dye and monomethine oxonol dye, and quinone dyes such as naphthoquinone dye and anthraquinone dye. Other examples of dyes include quinophthalone dyes, nitro-nitroso dyes, acrydine dyes, and acridinone dyes. The aforementioned yellow dyes may assume their yellow hues only when chromophore is partly dissociated. In this case, the counter cation may be an inorganic cation such as alkaline metal ion and ammonium ion or an organic cation such as pyridinium ion and quaternary ammonium salt ion or may be contained in a polymer cation as a partial structure.

If desired, the ink set of the invention may comprise a black ink composition incorporated therein. The incorporation of a black ink composition in the ink set of the invention makes it possible to form an image having a good contrast on a recording medium. In the ink set of the invention, the colorant to be incorporated in the black ink composition is not limited to one having a specific structure. However, the difference in light-resistance and ozone resistance between the other color ink compositions and the black ink composition is preferably small. As the black dyes employable herein there can be exemplified carbon black dispersion besides disazo dyes, trisazo dyes and tetraazo dyes.

(Inkjet Recording Method)

In accordance with the inkjet recording method of the invention, the aforementioned inkjet recording ink is energized to form an image on a known image-receiving material, i.e., ordinary paper, resin-coated paper, paper dedicated to inkjet disclosed in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, JP-A-10-337947, etc., film, electrophotographic paper, cloth, glass, metal, pottery, etc.

During the formation of an image, a polymer latex compound may be additionally used for the purpose of providing gloss or water resistance or improving weathering resistance. The time at which the latex compound is added to the image-receiving material may be before, after or during the provision of the colorant. Accordingly, the site at which the latex compound is added to the image-receiving material may be in the image-receiving paper or in the ink. Alternatively, the polymer latex may be used in the form of liquid material composed of polymer latex alone. In some detail, there can be used to advantage methods disclosed in JP-A-2002-166638, JP-A-2002-121440, JP-A-2002-154201, JP-A-2002-144696, JP-A-2002-80759, JP-A-2002-187342, and JP-A-2002-172774.

For the details of the recording paper and recording film on which the ink composition of the invention is inkjet-printed, reference can be made to JP-A-2002-371214.

The ink composition constituting the ink set of the invention comprises those properly selected from the aforementioned components incorporated therein. The ink composition thus prepared preferably exhibits a viscosity of less than 10 mPa·s at 20° C. Further, the ink composition of the invention preferably exhibits a surface tension of 45 mN/m or less, particularly preferably from 25 to 45 mN/m at 20° C. When the viscosity and surface tension of the ink composition of the invention are thus adjusted, an ink composition having desirable properties for inkjet recording can be obtained. The adjustment of viscosity and surface tension can be carried out by properly controlling and selecting the added amount of kind of solvent and various additives to be incorporated in the ink composition.

The ink composition constituting the ink set of the invention preferably exhibits a pH value of from 7.0 to 10.5, more preferably from 7.5 to 10.0 at 20° C. When the pH value of the ink composition at 20° C. is predetermined to be 7.0 or more, the exfoliation of eutectoidal deposit on the inkjet head can be prevented. Further, the ejection of the ink composition from the inkjet head can be stabilized. Moreover, when the pH value of the ink composition at 20° C. is predetermined to be 10.5 or less, the deterioration of various parts with which the ink composition comes in contact, e.g., parts constituting ink cartridge or inkjet head can be prevented.

As a method for the preparation of the ink composition of the invention there may be exemplified a method which comprises thoroughly mixing various components to be incorporated in the ink composition to effect dissolution as uniformly as possible, press-filtering the solution through a membrane filter having a pore diameter of 0.8 μm, and then subjecting the solution thus obtained to deaeration using a vacuum pump. However, the invention is not limited to this method.

The ink sets of the invention comprising the aforementioned ink compositions are advantageous in that they can be integrally or independently received to form ink cartridges and thus can be easily handled. An ink cartridge formed by ink sets is known in the art. Any known method can be properly used to form an ink cartridge.

The ink set or ink cartridge of the invention can be used in ordinary writing utensils, recorders, pen plotters, etc., particularly preferably in inkjet recording methods. The inkjet recording methods allowing the use of the ink set or ink cartridge of the invention include any recording methods which comprise ejecting the ink composition through a fine nozzle to form droplets, and then allowing the droplets to be attached to a recording medium. Specific examples of the inkjet recording methods allowing the use of the ink composition of the invention will be described below.

A first method is a method called electrostatic attraction method. The electrostatic attraction method is a method which comprises applying a strong electric field between a nozzle and an accelerating electrode disposed ahead of the nozzle so that the nozzle continuously ejects ink droplets which then pass through the gap between deflecting electrodes which are given a print data signal, whereby the ink droplets are allowed to fly onto a recording medium on which they are then fixed to record an image or a method which comprises thus ejecting the ink droplets toward the recording medium according to a print data signal without deflecting the ink droplets so that an image is fixed on the recording medium to record the image.

A second method is a method which comprises applying a pressure to an ink solution using a small-sized pump while mechanically oscillating the inkjet nozzle using a crystal oscillator or the like so that the ink droplets are forcedly ejected from the nozzle. The ink droplets which are ejected from the nozzle are immediately electrostatically charged. The ink droplets thus electrostatically charged then pass through a gap between deflecting electrodes which are given a print data signal. The ink droplets are then allowed to fly toward the recording medium on which an image is then recorded.

A third method is a method which comprises ejecting an ink solution toward the recording medium while being simultaneously given a pressure and a print data signal using a piezoelectric element so that an image is recorded on the recording medium.

A fourth method is a method which comprises heating an ink solution using a microelectrode according to a print signal data to foam the ink solution until the ink solution is expanded much enough to come out from the nozzle toward the recording medium on which an image is then recorded.

The ink set or ink cartridge of the invention is an ink composition which is particularly suitable for recording of an image on the recording medium using an image recording method involving an inkjet recording method, including the aforementioned four methods. The recorded matter thus obtained with the ink set of the invention has an excellent image quality and is excellent in light-resistance and ozone resistance.

EXAMPLE

The invention will be further described hereinafter in the following examples, but the invention is not limited thereto.

Example 1

Synthesis of Sodium-Potassium Mixed Salt of Exemplary Compound (d-5)

5-Amino-3-tert-butyl-4-cyanopyrazole (1) can be synthesized by a method disclosed in JP-A-2003-267943. Further, the coupler component (2) can be synthesized by a method disclosed in JP-A-2002-322151.

(1) Synthesis of Intermediate (d-5a)

A solution of 10.1 g (0.147 mol) in 20 ml of water was then added dropwise to 24.1 g (0.147 mol) of 5-amino-3-tert-butyl-4-cyanopyrazole (1), 45 ml of concentrated hydrochloric acid, 30 ml of acetic acid and 45 ml of propionic acid at an inner temperature of 0° C. with stirring in 10 minutes. The mixture was then continued to be stirred for 30 minutes. 84.7 g (0.147 mol) of the coupler component (2) was dissolved in a mixture of 231 ml of methanesulfonic acid, 147 ml of acetic acid and 221 ml of propionic acid, and then stirred at 0° C. The aforementioned diazonium salt was then added to the mixture in 30 minutes. After the addition of the diazonium salt, the reaction solution was then stirred for 30 minutes. The reaction solution was then gradually added to 2,250 ml of water which was being stirred with 750 g of ice. The intermediate (d-5a) thus precipitated was then isolated by suction filtration. Yield: 73.8 g (85%)

(2) Synthesis of Intermediate (d-5b)

To 21 g (35.5 mmol) of the intermediate (d-5a) were added 26.6 g (157 mmol) of 2-chlorobenzothiazole (3), 21.7 g of potassium carbonate and 147 ml of dimethyl sulfoxide. The mixture was then heated to an inner temperature of 92° C. with stirring while bubbled with nitrogen for 4 hours. After the termination of stirring, the mixture was allowed to cool to room temperature where the crystal precipitated was then isolated from the reaction system by suction filtration. The crude crystal thus obtained was dispersed in 3.0 l of water so that excess potassium carbonate was dissolved in water. The reaction product was then filtered with suction to obtain an intermediate (d-5b). Yield: 20.0 g (63.5%); λmax=558 nm (as measured in the form of dimethyl formamide solution); m/Z: POSI=858)

(3) Synthesis of Sodium-Potassium Mixed Salt of Exemplary Compound (d-5)

2.0 g (2.33 mmol) of the intermediate (d-5b) was dispersed in 7.0 g of sulfolane. To the dispersion thus obtained was then added dropwise 1.7 g of Nisso Sulfan (sulfur trioxide) at an inner temperature of 15° C. After the termination of dropwise addition, the mixture was then reacted at an inner temperature of 70° C. After the termination of reaction, the reaction solution was cooled to 20° C. where 2.0 ml of water was then added dropwise thereto. The reaction solution was cooled to an inner temperature of 5° C. where 3.3 ml of a 25 wt-% aqueous solution of sodium hydroxide was then added thereto. 0.8 ml of a 28 wt-% methanol solution of sodium methoxide was then added dropwise to the reaction mixture. 4 ml of methanol was then added dropwise to the reaction mixture. The inorganic salt thus precipitated was withdrawn by filtration, and then washed with 2.0 ml of methanol. To the filtrate thus obtained were then added 2.0 g of potassium acetate and 5.6 ml of methanol. To the filtrate was then added 22.5 ml of ethanol to cause a dye to be crystallized. The dye crystal was then subjected to suction filtration and washing with ethanol to obtain a crude crystal. The crude crystal containing an inorganic salt was then subjected to desalting/purification by gel chromatography using Sephadex LH-20 (produced by Pharmacia Inc.) (elute: 1:1 (v/v) mixture of water and methanol) to obtain a sodium-potassium mixed salt of Exemplary Compound (d-5). Yield: 2.0 g (66%); λmax: 567.1 nm; ϵ: 46,900 (as measured in the form of dimethyl sulfoxide solution)

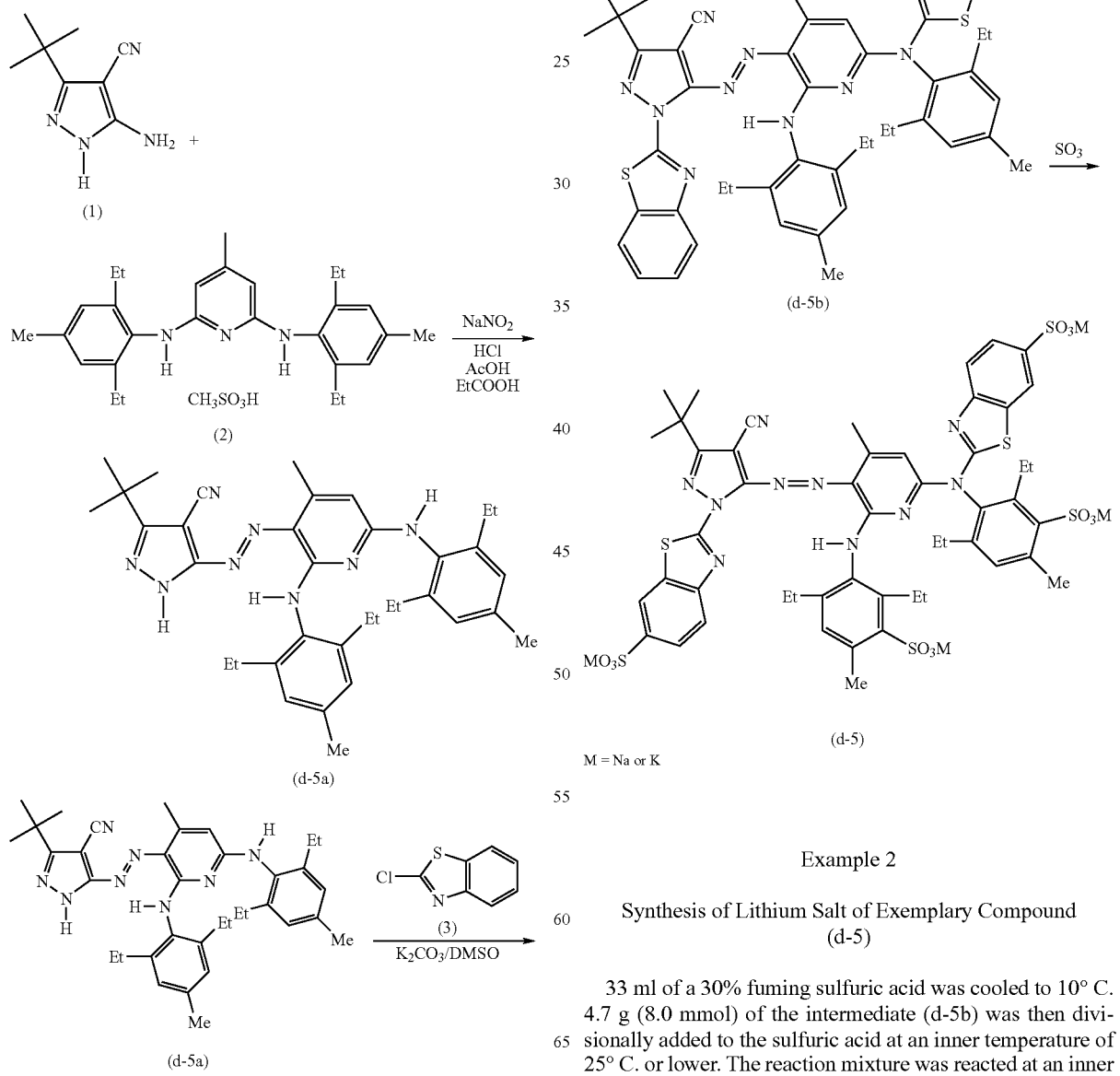

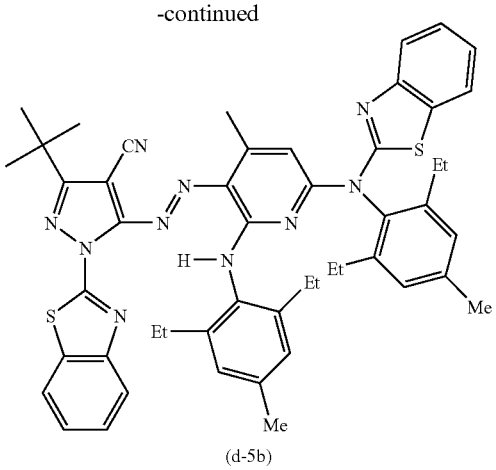

Example 2

Synthesis of Lithium Salt of Exemplary Compound (d-5)

33 ml of a 30% fuming sulfuric acid was cooled to 10° C. 4.7 g (8.0 mmol) of the intermediate (d-5b) was then divisionally added to the sulfuric acid at an inner temperature of 25° C. or lower. The reaction mixture was reacted at an inner temperature of 30° C. for 2.5 hours, and then cooled to an inner temperature of 0° C. where 24 ml of water was then added dropwise thereto. 42 ml of a 28% aqueous ammonia was then added dropwise to the reaction mixture. A dye was then extracted with 26 ml of a 21:5 mixture of isopropanol and n-butanol. The dye thus extracted was then adjusted to a pH value of 9.0 with a 25 wt-% aqueous solution of sodium hydroxide. To the dye was then added dropwise 20 ml of ethanol. The inorganic salt thus precipitated was then removed by filtration. To the filtrate were then added 10 ml of methanol, 6.0 g of sodium acetate and 2.4 g of potassium acetate. The temperature of the solution was then raised to 65° C. To the solution was then added dropwise 80 ml of ethanol. The reaction mixture was then allowed to cool to room temperature. The crystal thus precipitated was then withdrawn by filtration. The crystal thus obtained was then dissolved in 30 ml of water. This solution was then allowed to pass through a filled column comprising a tubular column filled with 50 ml of a lithium type strongly acidic cation exchange resin (resin obtained by converting Amberlite IR-120B into a lithium type; produced by ORGANO Corporation) at a temperature of 25° C. and a flow rate of about SV4. The aqueous solution which has passed through the filled column was adjusted to a pH value of 7.0 with a diluted aqueous solution of lithium hydroxide, and then filtered through a membrane filter having an average pore diameter of 0.22 μm. The filtrate was then concentrated and dried under reduced pressure using a rotary evaporator. The crystal thus obtained was dried at 70° C. overnight to obtain a lithium salt of Exemplary Compound (d-5). Yield: 4.0 g (41%); λmax: 566.9 nm; ε: 45,800 (as measured in the form of dimethyl sulfoxide solution)

Example 3

Preparation of Various Ink Compositions

Various components according to the formulation set forth in Table 1 below were stirred at ordinary temperature for 30 minutes. The solutions thus obtained were then filtered through a membrane filter having a mesh of 1.0 μm to obtain various ink compositions. In Table 1, the numerical value with the various components each indicate % by mass of the component based on 100% by mass of the ink composition. The term "balance" which indicates the amount of water is meant to indicate the value that makes 100% with that of components other than water.

In Table 1, Y-01 represents a yellow ink composition, M-01 to M-07 each represent a magenta ink composition, and C-01 to C-02 each represent a cyan ink composition. In Table 1, as a yellow dye there was used a compound represented by the following general formula (Y-1), as magenta dyes there were used compounds represented by the following general formulae (M-1) to (M-6), and as cyan dyes there were used compounds represented by the following general formulae (C-1) to (C-2).

(Y-1):

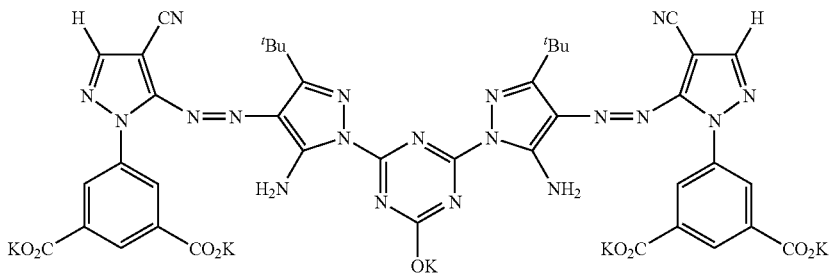

(M-1): Sodium-potassium mixed salt of Exemplary Compound

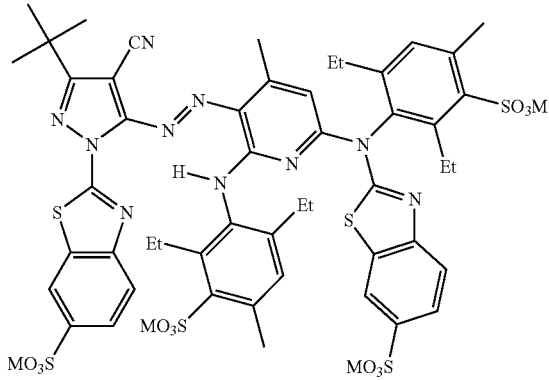

M = Na, K
(Na:K = 1.5:2.5)

(M-2): Lithium salt of Exemplary Compound (d-5)

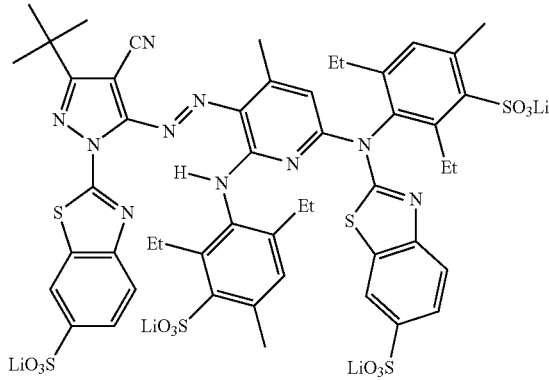

(M-3): Compound disclosed in JP-A-2003-192930

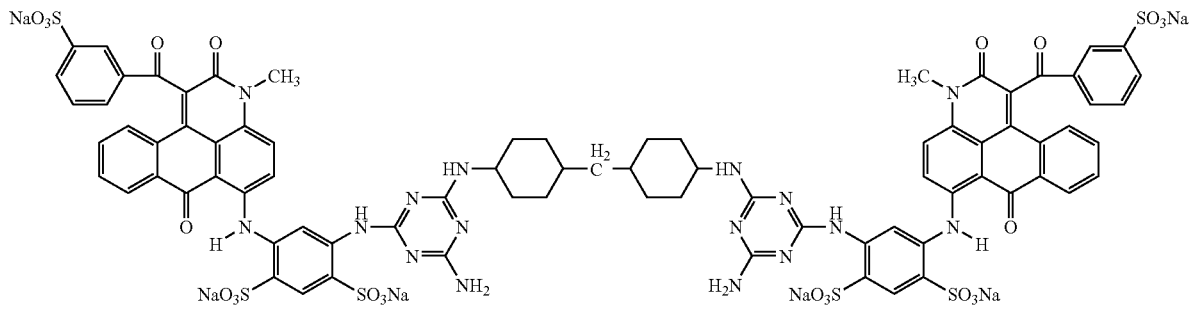

(M-4): Sodium salt of compound disclosed in International Publication No. 04/104108

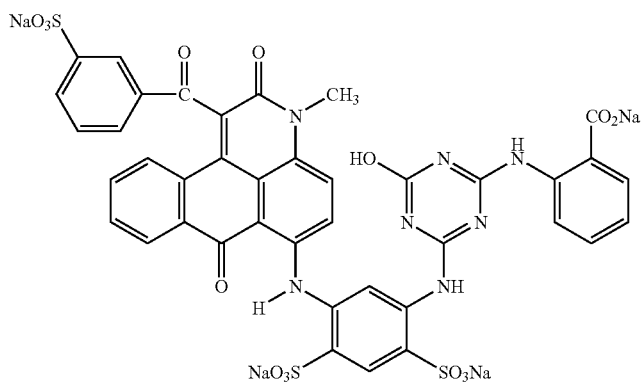

(M-5): Sodium salt of Exemplary Compound (D-1)

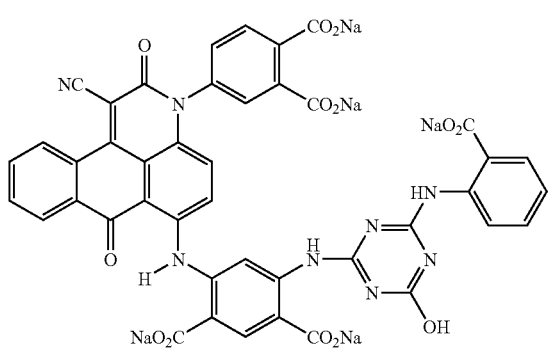

(M-6): Ammonium salt of compound disclosed in JP-A-2005-105137

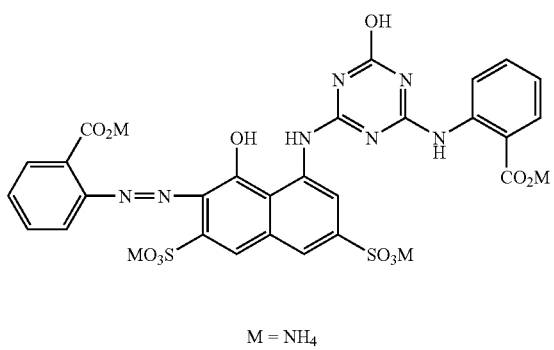

M = NH₄

(C-1): Compound disclosed in JP-A-2004-002670

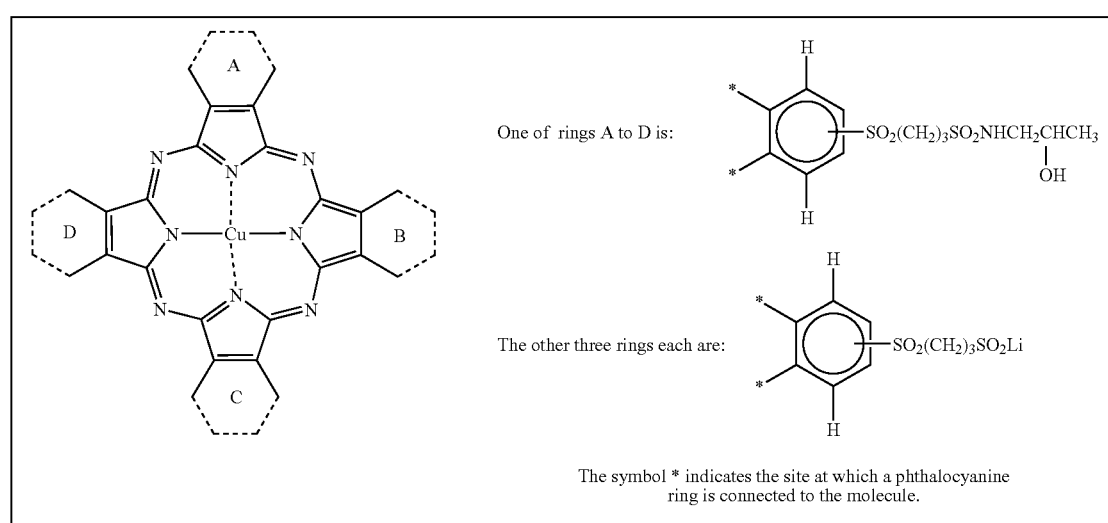

One of rings A to D is: a phenyl group with —SO$_2$(CH$_2$)$_3$SO$_2$NHCH$_2$CHCH$_3$ with OH substituent The other three rings each are: a phenyl group with —SO$_2$(CH$_2$)$_3$SO$_2$Li The symbol * indicates the site at which a phthalocyanine ring is connected to the molecule.

(C-2): Compound disclosed in International Publication No. 04/087815

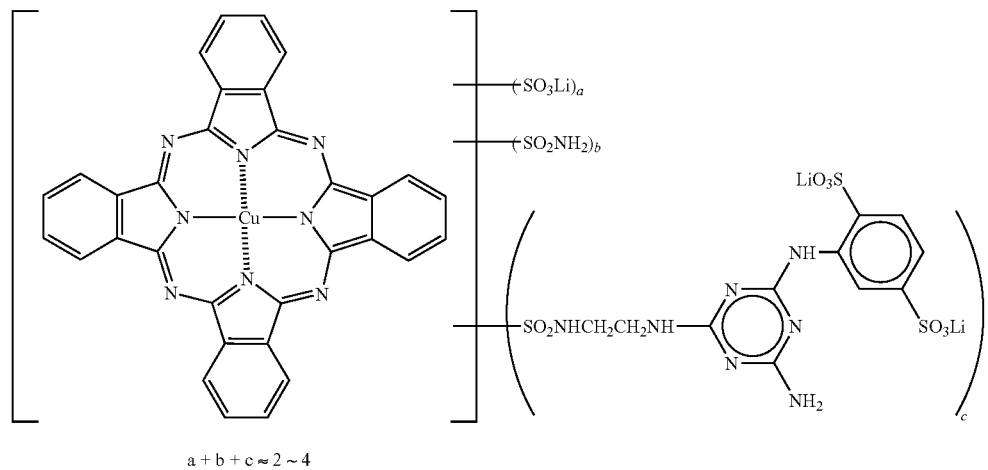

$a + b + c \approx 2 \sim 4$

TABLE 1

|  | Yellow ink | Magenta ink | | | | | | | Cyan ink | |
|---|---|---|---|---|---|---|---|---|---|---|
|  | Y-01 | M-01 | M-02 | M-03 | M-04 | M-05 | M-06 | M-07 | C-01 | C-02 |
| (Y-1) | 5 | | | | | | | | | |
| (M-1) | | 1.5 | | | | | | | | |
| (M-2) | | | 1.5 | 1.5 | 1 | 2 | | | | |
| (M-3) | | 2 | 2 | | 2 | | 4 | | | |
| (M-4) | | | | 2 | | | | 2 | | |
| (M-5) | | | | | | | | | | |
| (M-6) | | | | | 0.5 | 1.5 | | 2 | | |
| (C-1) | | | | | | | | | 5 | |
| (C-2) | | | | | | | | | | 5 |
| Glycerin | 9 | 10 | 10 | 10 | 10 | 10 | 10 | 10 | 11 | 11 |
| Triethylene glycol | 9 | 2 | 2 | 2 | 2 | 2 | 6 | 6 | 10 | 10 |
| Propylene glycol | | | | | | | | | | |
| 1,2-Hexane diol | | 1 | 1 | 1 | 1 | 1 | | | 3.5 | 3.5 |
| TEGmBE | 9 | 10 | 10 | 10 | 10 | 10 | 10 | 10 | 9 | 9 |
| DEGmBE | | | | | | | | | | |
| Olfine E1010 | | | | | | | 1 | 1 | | |
| Surfinol 104PG50 | 1 | 1 | 1 | 1 | 1 | 1 | | | 1.1 | 1.1 |
| 2-Pyrrolidone | 2 | 0.5 | 0.5 | 0.5 | 0.5 | 0.5 | | | 3.5 | 3.5 |
| Urea | 1 | 2 | 2 | 2 | 2 | 2 | 5 | 5 | 1 | 1 |
| Triethanol amine | 0.7 | 0.5 | 0.5 | 0.5 | 0.5 | 0.5 | 0.5 | 0.5 | 0.5 | 0.5 |
| Proxel XL-2 | 0.5 | 0.5 | 0.5 | 0.5 | 0.5 | 0.5 | 0.3 | 0.3 | 0.3 | 0.3 |
| Water | Balance | Balance | Balance | Balance | Balance | Balance | Balance | Balance | Balance | Balance |

In Table 1, TEGmBE represents triethylene glycol monobutyl ether and DEGmBE represents diethylene glycol monobutyl ether.

The various ink compositions thus prepared were then combined as set forth in Table 2 below to prepare ink sets A to G. The ink sets having various ink compositions combined set forth in Table 2 didn't include light ink compositions, i.e., light magenta ink composition and light cyan ink composition.

TABLE 2

|  | Ink set | Yellow | Magenta | Cyan |
|---|---|---|---|---|
| Inventive | A | Y-01 | M-01 | C-01 |
| Inventive | B | Y-01 | M-02 | C-01 |
| Inventive | C | Y-01 | M-03 | C-01 |
| Inventive | D | Y-01 | M-04 | C-02 |

TABLE 2-continued

|  | Ink set | Yellow | Magenta | Cyan |
|---|---|---|---|---|
| Comparative | E | Y-01 | M-05 | C-01 |
| Comparative | F | Y-01 | M-06 | C-01 |
| Comparative | G | Y-01 | M-07 | C-02 |

(Image Recording and Evaluation)

Using a Type Stylus Color 880 (trade name) inkjet printer (produced by SEIKO EPSON CORPORATION) and the ink sets set forth in Table 2 above, various monochromatic image patterns composed of yellow, magenta and cyan colors the density of which vary stepwise such that OD value thereof reaches a range of from 0.7 to 1.8 and green, red and gray image patterns were printed on a recording medium dedicated to inkjet {photographic paper (glossy) produced by SEIKO EPSON CORPORATION}. These image were then evaluated for light fastness, ozone fastness and hue change (at gray area) under high humidity conditions.

For the evaluation of light fastness, the image which had been recorded was immediately measured for density Ci, irradiated with xenon light (85,000 lux) using a weatherometer (Atras C.165) for 7 days, and then measured again for density Cf. From the difference in image density between before and after irradiation with xenon light was calculated percent dye remaining ({Ci−Cf}/Ci)×100%) which was then evaluated. For the measurement of image density, a Type X-Rite 310TR reflection densitometer was used. The percent dye remaining was measured at three points of reflection density, i.e., 1, 1.5 and 2.0. The results of evaluation are set forth in Table 3 below. In Table 3, a three-step evaluation was made. In some detail, when the percent dye remaining was 80% or more at all the points, it was then judged good (G). When the percent dye remaining was less than 80% at two of the three points, it was then judged fair (F). When the percent dye remaining was less than 80% at all the points, it was then judge poor (P).

For the evaluation of ozone fastness, the image which had been recorded was measured for density using a Type X-Rite 310TR reflection densitometer, immediately allowed to stand in a box the ozone gas concentration in which had been predetermined to 5 ppm for 24 hours, and then measured for image density using the same reflection densitometer. The difference in image density between after before and after standing in ozone gas was then evaluated as percent dye remaining. The percent dye remaining was measured at three points of reflection density, i.e., 1, 1.5 and 2.0. The ozone gas concentration in the box was predetermined by a Type OZG-EM-01 ozone gas monitor (produced by APPLICS Inc.). The results of evaluation are set forth in Table 3 below. In Table 3, a three-step evaluation was made. In some detail, when the percent dye remaining was 70% or more at all the points, it was then judged good (G). When the percent dye remaining was less than 70% at one or two of the three points, it was then judged fair (F). When the percent dye remaining was less than 70% at all the points, it was then judge poor (P).

For the evaluation of hue change under high humidity conditions, the image was allowed to stand under the conditions of 40° C.-85% RH for 3 days, and then measured for Δa* value at gray area. The hue change was then evaluated in a three-step criterion. In some detail, when Δa* value was less than 2.0 under all conditions, it was then judged good (G). When Δa* value was from not smaller than 2.0 to not greater than 4.0 under any conditions, it was then judged fair (F). When Δa* value was not smaller than 4.0 under any conditions, it was then judge poor (P).

As set forth in Table 3, the images obtained from the ink sets A to D of the invention exhibited better light fastness and ozone fastness, a smaller hue change at gray area and a smaller difference in light fastness and ozone fastness between ink compositions than those obtained from the comparative ink sets E to G.

Example 4

Using a Type BJ-F850 inkjet printer (produced by CANON Corp.) the cartridge of which was filled with the same inks as prepared in Example 3, an image was printed on a Type PR-101 professional photopaper (produced by CANON Corp.). The image was then evaluated in the same manner as in Example 3. As a result, results similar to that of Example 3 were obtained.

INDUSTRIAL APPLICABILITY

The use of the ink set of the invention makes it possible to obtain a colored image having excellent light-fastness and ozone fastness, a small hue change in gray area and a small difference in light-fastness and ozone fastness among various ink compositions.

The invention concerns an ink set having a good fixability to an image-receiving material even under high humidity conditions and comprising a magenta ink composition capable of giving a colored image excellent in light-resistance and ozone resistance and a cyan ink composition capable of giving a colored image excellent in light-resistance and ozone resistance. In particular, an inkjet recording method using the ink set of the invention can be provided capable of giving a colored image having light-resistance and ozone resistance that are well-balanced among the ink compositions.

The invention claimed is:

1. An ink set comprising at least a magenta ink composition and a cyan ink composition,
wherein
the magenta ink composition comprises:
at least one colorant selected from the group consisting of compounds represented by a general formula (1); and
at least one colorant selected from the group consisting of compounds represented by a general formula (2), and
the cyan ink composition comprises at least one colorant selected from the group consisting of phthalocyanine compounds meeting requirements 1 and 2:
Requirement 1: the ratio of the maximum absorbance within the absorption band of from 660 nm to 680 nm to the maximum absorbance within the absorption band of from 600 nm to 640 nm on the spectral absorption curve of aqueous solution is less than 1; and
Requirement 2: the oxidation potential is more positive than 1.0 eV (vsSCE);

TABLE 3

| | | Light fastness | | | Ozone fastness | | | Hue change |
| --- | --- | --- | --- | --- | --- | --- | --- | --- |
| | Ink set | Yellow | Magenta | Cyan | Yellow | Magenta | Cyan | at gray area |
| Inventive | A | G | G | G | G | G | G | G |
| Inventive | B | G | G | G | G | G | G | G |
| Inventive | C | G | G | G | G | G | G | G |
| Inventive | D | G | G | G | G | G | F | G |
| Comparative | E | G | F | G | G | F | G | F |
| Comparative | F | G | F | G | G | F | G | F |
| Comparative | G | G | P | G | G | P | F | G |

General Formula (1)

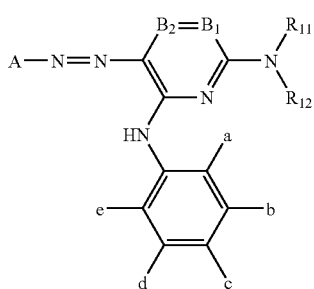

wherein A represents a residue of 5-membered heterocyclic diazo component A-NH$_2$; B$_1$ and B$_2$ represent —CR$_{13}$═ and —CR$_{14}$═, respectively, or one of B$_1$ and B$_2$ represents a nitrogen atom and the other represents one of —CR$_{13}$═ and —CR$_{14}$═; R$_{11}$ and R$_{12}$ each independently represent one of a hydrogen atom, aliphatic group, aromatic group, heterocyclic group, acyl group, alkoxycarbonyl group, aryloxycarbonyl group, carbamoyl group, alkylsulfonyl group, arylsulfonyl group and sulfamoyl group; R$_{13}$ and R$_{14}$ each independently represent one of a hydrogen atom, halogen atom, aliphatic group, aromatic group, heterocyclic group, cyano group, carbamoyl group, alkoxycarbonyl group, aryloxycarbonyl group, acyl group, hydroxyl group, alkoxy group, aryloxy group, silyloxy group, acyloxy group, carbamoyloxy group, heterocyclic oxy group, alkoxycarbonyloxy group, aryloxycarbonyloxy group, amino group, acylamino group, aminocarbonylamino group, sulfamoylamino group, alkoxycarbonylamino group, aryloxycarbonylamino group, alkylsulfonylamino group, arylsulfonylamino group, nitro group, alkylthio group, arylthio group, alkylsulfonyl group, arylsulfonyl group, alkylsulfiyl group, arylsulfinyl group, sulfamoyl group, heterocyclic thio group and ionic hydrophilic group, with the proviso that R$_{13}$ and R$_{11}$ or R$_{11}$ and R$_{12}$ may be bonded to each other to form one of a 5-membered ring and 6-membered ring; a and e each independently represent one of an alkyl group, alkoxy group and halogen atom, with the proviso that when a and e each are an alkyl group, the total number of carbon atoms constituting the alkyl group is 3 or more and the alkyl group may be substituted; b, c and d each have the same meaning as R$_{13}$ or R$_{14}$; and a and b or e and d may be condensed to each other, with the proviso that the general formula (1) has at least one ionic hydrophilic group; and General Formula (2)

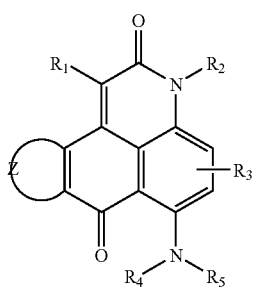

wherein R$_1$ is one selected from the group consisting of cyano group, arylsulfonyl group and alkylsulfonyl group; R$_2$ and R$_3$ each independently represent one of a hydrogen atom and substituent; R$_4$ and R$_5$ each independently represent one of a hydrogen atom, aliphatic group, aromatic group and heterocyclic group; and Z represents a nonmetallic atom group required to form one of a 5- to 7-membered aromatic ring with carbon atoms and 5- to 7-membered heterocyclic ring with carbon atoms, with the proviso that the general formula (2) has at least one ionic hydrophilic group.

2. The ink set as claimed in claim 1, wherein the cyan ink composition comprises at least one colorant selected from the group consisting of phthalocyanine compounds represented by a general formula (3):

General Formula (3)

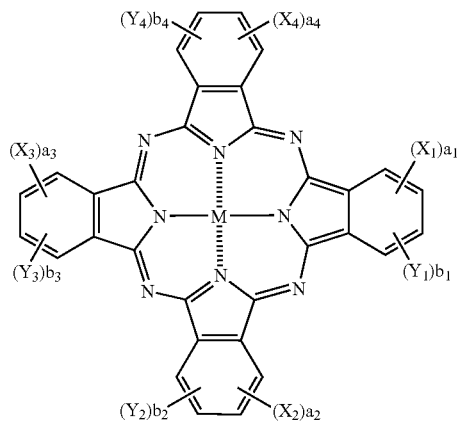

wherein X$_1$, X$_2$, X$_3$ and X$_4$ each independently represent one of —SO—Z, —SO$_2$—Z, —SO$_2$NV$_1$V$_2$, —CONV$_1$V$_2$, —CO$_2$Z, —CO—Z and sulfo group in which Z's each independently represent one of a substituted or unsubstituted aliphatic group, substituted or unsubstituted aromatic group and substituted or unsubstituted heterocyclic group; V$_1$ and V$_2$ may be the same or different and each represent one of a hydrogen atom, substituted or unsubstituted aliphatic group, substituted or unsubstituted aromatic group and substituted or unsubstituted heterocyclic group; Y$_1$, Y$_2$, Y$_3$ and Y$_4$ each independently represent one of a hydrogen atom, halogen atom, aliphatic group, aromatic group, heterocyclic group, cyano group, hydroxyl group, nitro group, amino group, alkylamino group, alkoxy group, aryloxy group, amide group, arylamino group, aminocarbonylamino group, sulfamoylamino group, alkylthio group, arylthio group, alkoxycarbonylamino group, sulfonamide group, carbamoyl group, sulfamoyl group, alkoxycarbonyl group, heterocyclic oxy group, azo group, acyloxy group, carbamoyloxy group, silyloxy group, aryloxycarbonyl group, aryloxycarbonylamino group, imido group, heterocyclic thio group, phosphoryl group, acyl group and ionic hydrophilic group; a$_1$ to a$_4$ and b$_1$ to b$_4$ each represent the number of substituents on X$_1$ to X$_4$ and Y$_1$ to Y$_4$, respectively, with the proviso that a$_1$ to a$_4$ each independently represent an integer of from 0 to 4 and are not 0 at the same time and b$_1$ to b$_4$ each independently represent an integer of from 0 to 4; and M represents one of a hydrogen atom, metal atom and oxide, hydroxide or halide thereof, with the proviso that at least one of X$_1$, X$_2$, X$_3$, X$_4$, Y$_1$, Y$_2$, Y$_3$ and Y$_4$ is one of an ionic hydrophilic group and a group having an ionic hydrophilic group as substituent.

3. The ink set as claimed in claim 1, wherein the mass ratio of the compound represented by the general formula (1) to the compound represented by the general formula (2) in the magenta ink composition is from 1:1 to 1:4.

4. The ink set as claimed in claim 1, wherein the concentration of free copper ions in the cyan ink composition is 10 ppm or less.

5. The ink set as claimed in claim 1, wherein the general formula (1) is represented by a general formula (4):

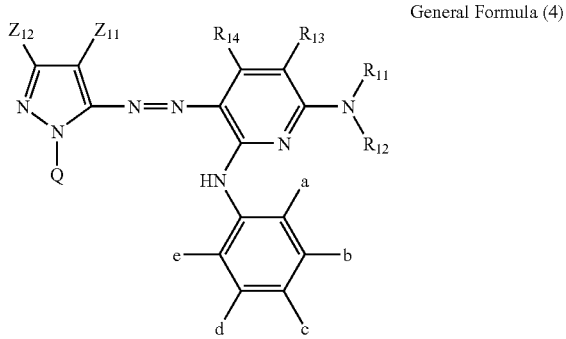

General Formula (4)

wherein $Z_{11}$ represents an electron withdrawing group having a Hammett's substituent constant σp value of 0.20 or more; $Z_{12}$ represents one of a hydrogen atom, aliphatic group, aromatic group, heterocyclic group and acyl group; $R_{11}$, $R_{12}$, $R_{13}$, $R_{14}$, a, b, c, d and e each are as claimed in the general formula (1); and Q represents one of a hydrogen atom, aliphatic group, aromatic group and heterocyclic group, with the proviso that the general formula (4) has at least one ionic hydrophilic group.

6. The ink set as claimed in claim 1,
wherein, in the general formula (2),
$R_3$ represents one of a hydrogen atom and aryloxy group.

7. The ink set as claimed in claim 1, wherein Z in the general formula (2) is an anthrapyridone compound represented by a general formula (5) which forms a benzene ring with carbon atoms:

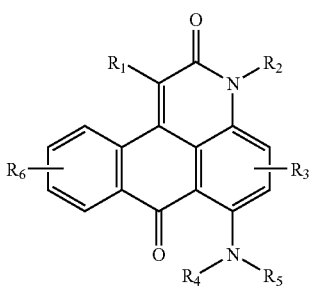

General Formula (5)

wherein $R_6$ represents one of a hydrogen atom and substituent; $R_1$, $R_2$, $R_3$, $R_4$ and $R_5$ each are as defined in the general formula (2), with the proviso that the general formula (5) has at least one ionic hydrophilic group.

8. The ink set as claimed in claim 1,
wherein
which includes first and second magenta ink compositions having different color densities, respectively,
at least one of the first and second magenta ink compositions being the magenta ink composition according to claim 1.

9. The ink set as claimed in claim 1,
wherein
which includes first and second cyan ink compositions having different color densities, respectively,
at least one of the first and second cyan ink compositions being the cyan ink composition according to claim 1.

10. An ink cartridge comprising an ink set as claimed in claim 1 integrally or independently received therein.

11. An inkjet printer comprising an ink cartridge as claimed in claim 10 mounted therein.

12. An inkjet recording method comprising:
recording by using an ink set as claimed in claim 1.

13. An inkjet recording method comprising:
forming an image on an image-receiving material having an ink-receptive layer containing an inorganic white pigment provided on a support by using an ink set as claimed in claim 1.

14. An inkjet recording method comprising:
recording by using an ink cartridge as claimed in claim 10.

15. An inkjet recording method comprising:
forming an image on an image-receiving material having an ink-receptive layer containing an inorganic white pigment provided on a support by using an ink cartridge as claimed in claim 10.

\* \* \* \* \*